US011243658B1

(12) United States Patent
Yin et al.

(10) Patent No.: US 11,243,658 B1
(45) Date of Patent: Feb. 8, 2022

(54) INTELLIGENT DIRECTIVES FOR USER INTERFACE INTERACTIONS

(71) Applicant: Pinterest, Inc., San Francisco, CA (US)

(72) Inventors: Pei Yin, Belmont, CA (US); Daniel Chu, San Francisco, CA (US); Linus Chung, San Francisco, CA (US); Angel Steger, San Francisco, CA (US); Scott Tong, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 227 days.

(21) Appl. No.: 15/610,271

(22) Filed: May 31, 2017

(51) Int. Cl.
| | | |
|---|---|---|
| *G06Q 10/10* | (2012.01) | |
| *G06Q 10/06* | (2012.01) | |
| *G06Q 30/02* | (2012.01) | |
| *G06Q 30/06* | (2012.01) | |
| *G06Q 10/08* | (2012.01) | |
| *G06F 3/0482* | (2013.01) | |
| *G06N 20/00* | (2019.01) | |
| *G06F 16/951* | (2019.01) | |
| *G06F 3/0485* | (2013.01) | |

(52) U.S. Cl.
CPC .......... *G06F 3/0482* (2013.01); *G06F 16/951* (2019.01); *G06N 20/00* (2019.01); *G06F 3/0485* (2013.01); *G06F 2203/04806* (2013.01)

(58) Field of Classification Search
CPC ... G06Q 50/01; G06Q 30/016; G06Q 30/0281
USPC .................................................. 705/1.1–912
See application file for complete search history.

(56) References Cited

U.S. PATENT DOCUMENTS

| | | | | |
|---|---|---|---|---|
| 9,851,874 B2 * | 12/2017 | van de Bruggen | ... | G06F 3/0484 |
| 10,572,954 B2 * | 2/2020 | Goodyear | ............ | G06Q 40/123 |
| 2011/0258049 A1 * | 10/2011 | Ramer | ................... | G06Q 30/02 |
| | | | | 705/14.66 |
| 2012/0096488 A1 * | 4/2012 | Wei | .......................... | H04N 9/79 |
| | | | | 725/34 |
| 2013/0073387 A1 * | 3/2013 | Heath | ................... | G06Q 50/01 |
| | | | | 705/14.53 |
| 2013/0073473 A1 * | 3/2013 | Heath | ................... | G06Q 30/02 |
| | | | | 705/319 |
| 2013/0275120 A1 * | 10/2013 | DeGross | ................. | G06F 17/28 |
| | | | | 704/9 |
| 2014/0052696 A1 * | 2/2014 | Soroushian | .......... | H04N 21/482 |
| | | | | 707/691 |
| 2014/0156676 A1 * | 6/2014 | Brust | ................... | G06F 3/0481 |
| | | | | 707/748 |

(Continued)

*Primary Examiner* — Jonathan P Ouellette
(74) *Attorney, Agent, or Firm* — Lee & Hayes, P.C.

(57) ABSTRACT

Techniques described herein are directed to generating and presenting customized directives for facilitating interactions between user(s) and user interface(s) associated with a content service provider. In an example, the content service provider may determine a state associated with a user based on user data associated with the user. Additionally, the content service provider may receive context data identifying an action performed by the user in association with content item(s) presented via a graphical user interface (GUI) and may determine an intent of the user based at least partly on the context data. Based at least partly on the state associated with the user and the intent of the user, the content service provider may determine a directive for prompting the user to access and/or use a feature associated with the content service provider and may cause a change to the GUI to communicate the directive.

20 Claims, 9 Drawing Sheets

(56) References Cited

U.S. PATENT DOCUMENTS

| | | | |
|---|---|---|---|
| 2014/0181652 A1* | 6/2014 | Stanke | G06F 9/453 |
| | | | 715/708 |
| 2016/0239848 A1* | 8/2016 | Chang | G06Q 30/016 |
| 2016/0314279 A1* | 10/2016 | Slepian | G06F 3/0481 |
| 2016/0360336 A1* | 12/2016 | Gross | H04W 4/025 |
| 2017/0189809 A1* | 7/2017 | Posin | A63F 13/35 |
| 2018/0052100 A1* | 2/2018 | Babin | G01N 21/33 |
| 2019/0141494 A1* | 5/2019 | Gross | H04W 4/40 |

\* cited by examiner

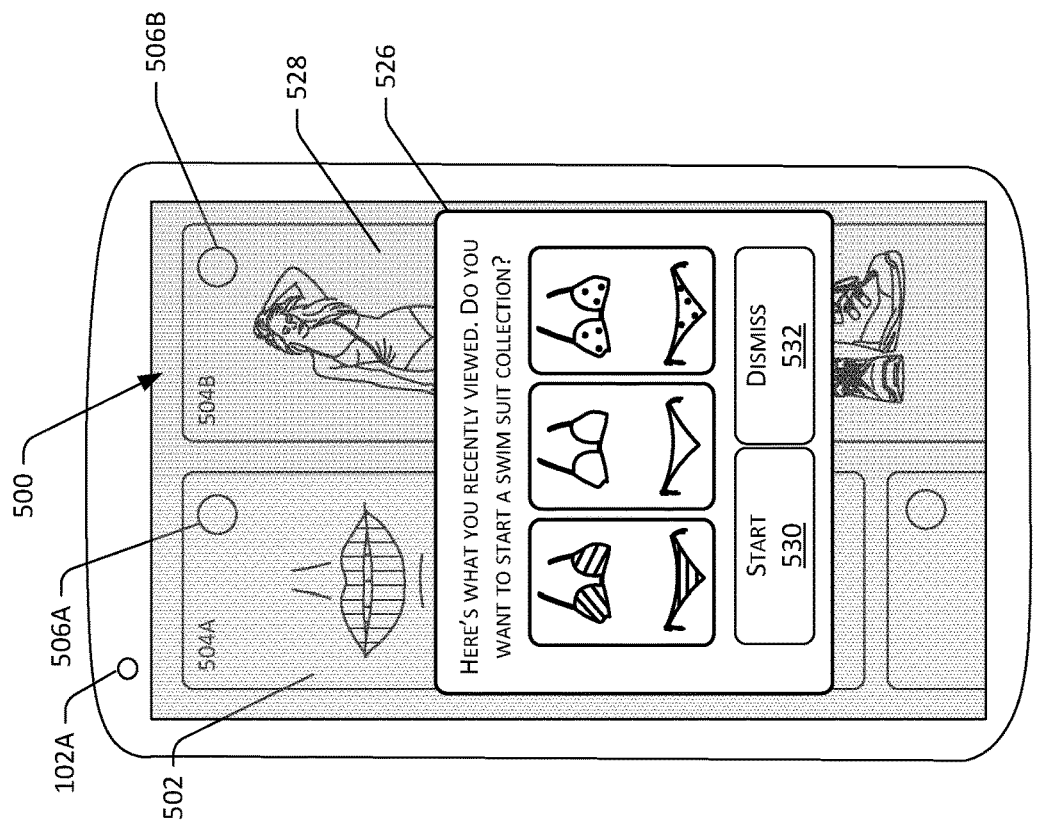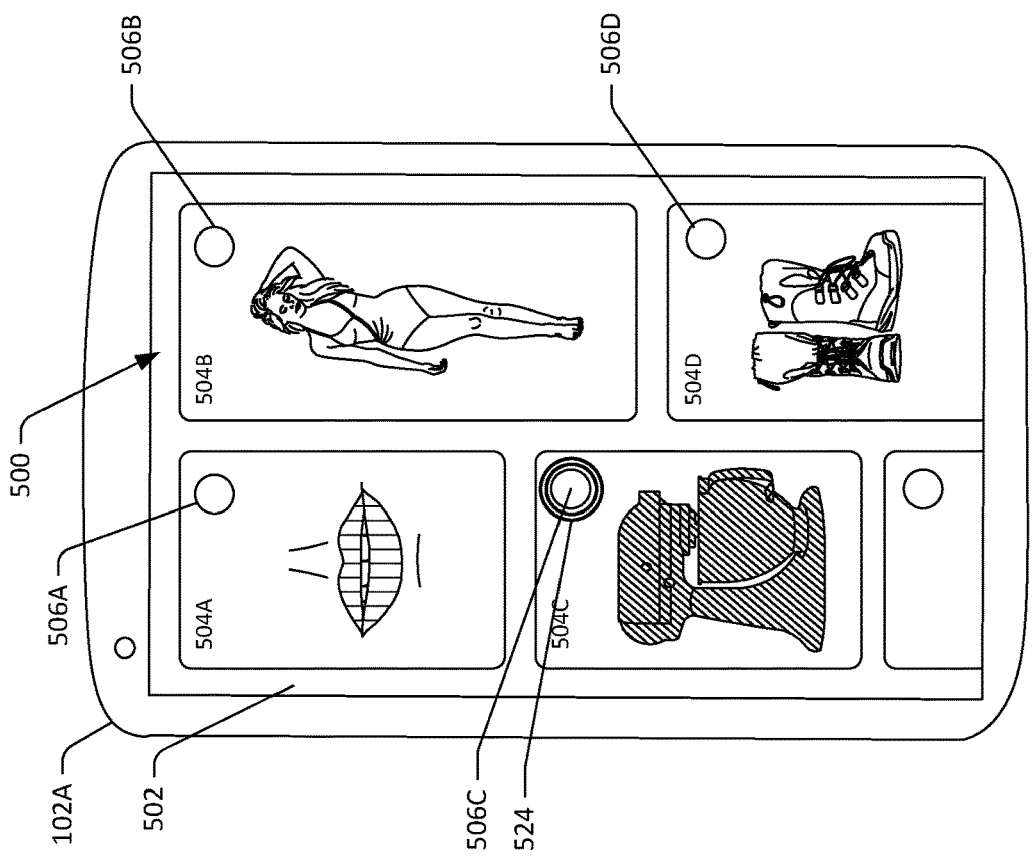

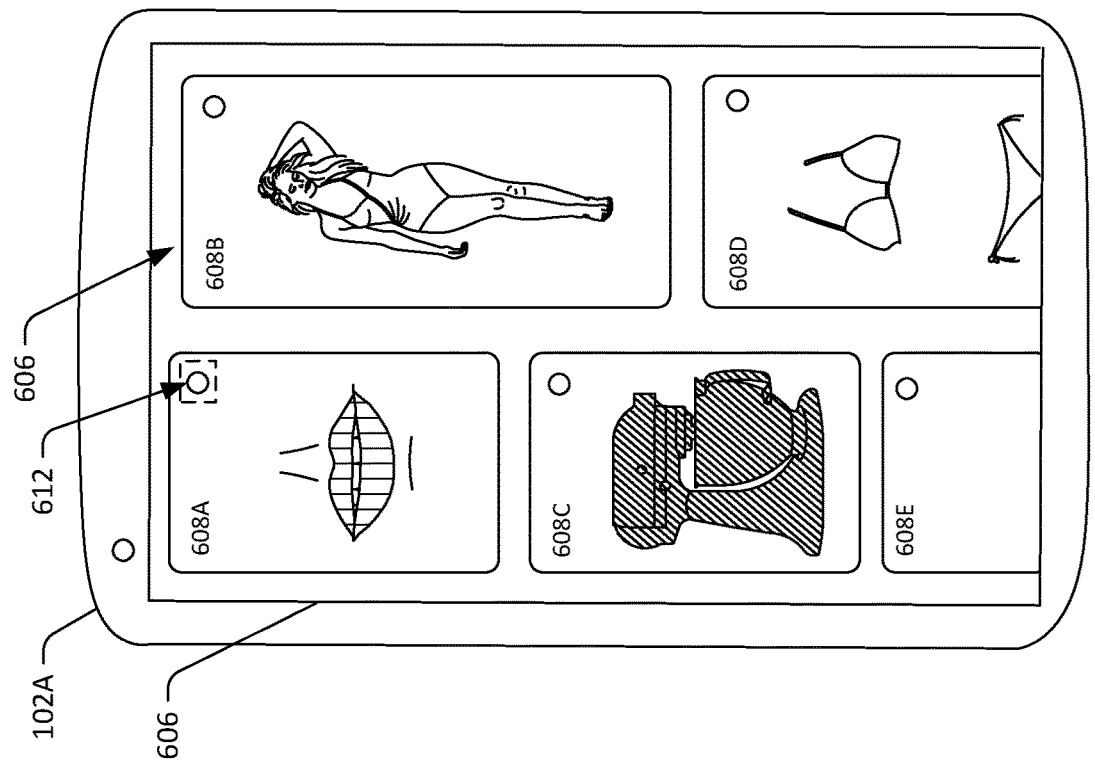
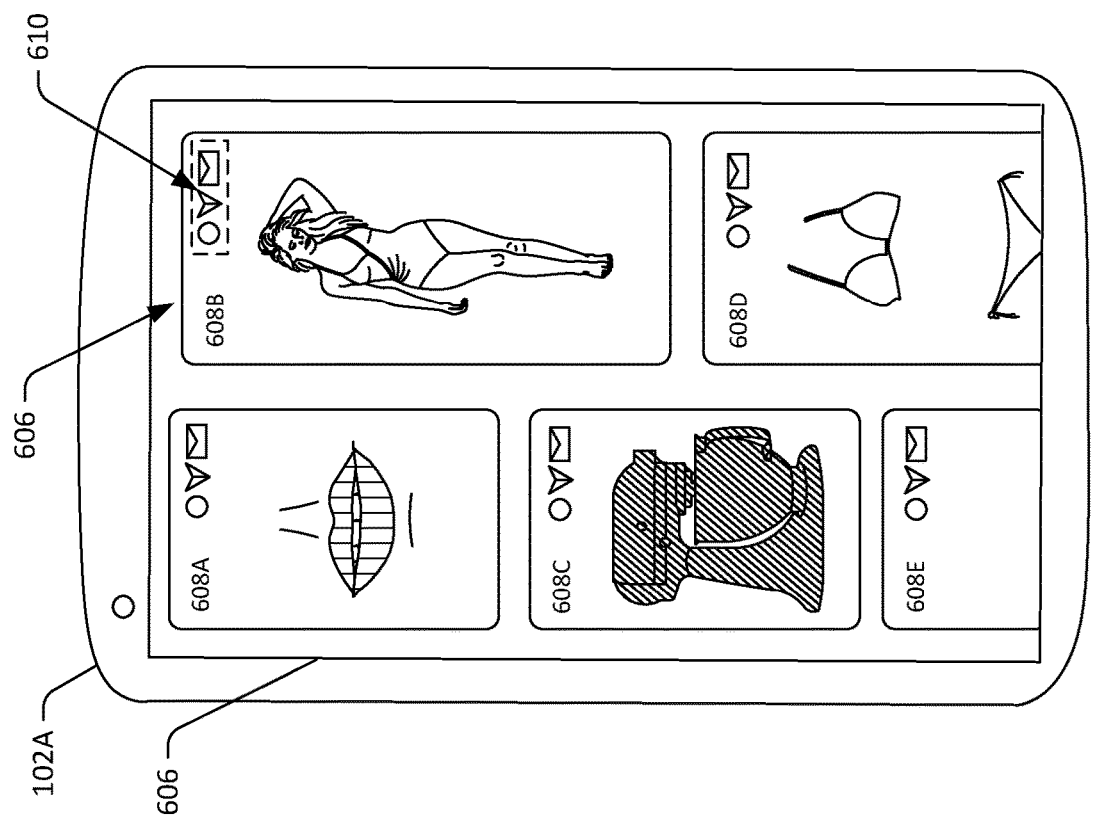

INTELLIGENT DIRECTIVES FOR USER INTERFACE INTERACTIONS

BACKGROUND

A content service provider may provide a service for users to share, collect, and/or explore content, including but not limited to images, videos, etc. In some examples, users may interact with graphical user interface(s) associated with the content service provider to upload, save, sort, search, and manage content. In at least one example, users may be new users and may not know how to interact with the content service provider. In other examples, returning users may be unaware of features that are offered by the content service provider. Accordingly, current techniques for interacting with a content service provider may be confusing and may provide a poor user experience.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 5A-5F illustrate examples of graphical elements presented via a graphical user interface, the graphical elements presenting directives for user interface interactions.

FIGS. 6A-6D illustrate examples of graphical user interface presentations for presenting directives associated with user interface interactions.

DETAILED DESCRIPTION

Figure 1:
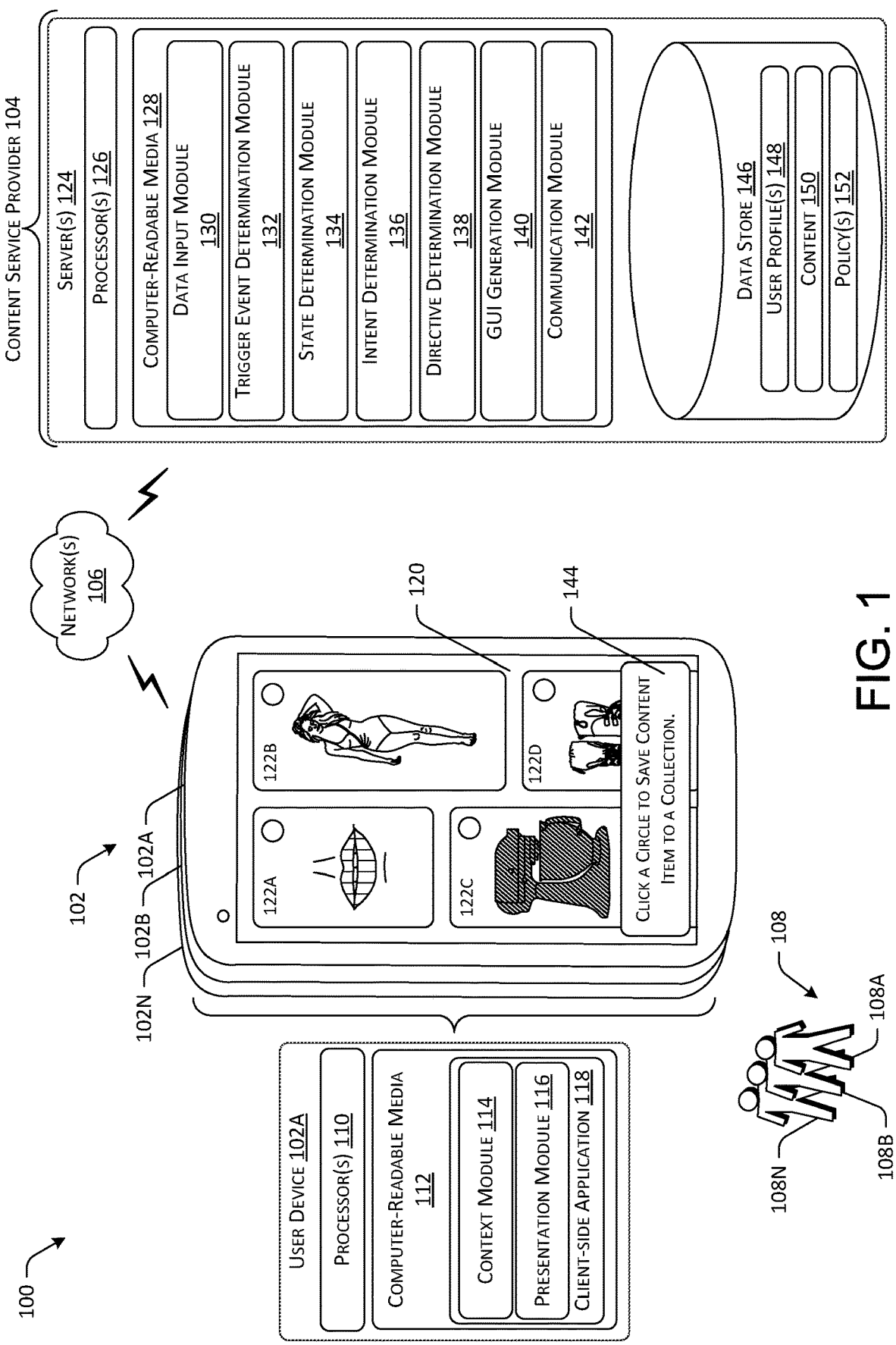
FIG. 1 illustrates an environment for determining and presenting directives for user interface interactions.

Techniques described herein are directed to generating and presenting customized directives for facilitating interactions between user(s) and user interface(s) associated with a content service provider. In at least one example, a content service provider may enable users to interact with content (e.g., images, videos, etc.) via graphical user interface(s) (GUI). For instance, users may upload content items (and/or indications thereof) to the content service provider via a GUI, save content items (and/or indications thereof) associated with the content service provider to personal user profiles via a GUI, sort content items (and/or indications thereof) into collections via a GUI, search for content items (and/or indications thereof) associated with the content service provider via a GUI, and/or otherwise manage content items (and/or indications thereof) associated with the content service provider via a GUI. In additional and/or alternative examples, a content service provider may enable users to interact with content via voice control user interface(s), haptic user interfaces, etc.

As described above, in some examples, new users may not know how to interact with the user interface(s) and/or various features that are offered by the content service provider. In additional and/or alternative examples, returning users may be unaware of features that are offered by the content service provider. Accordingly, current techniques for interacting with a content service provider may be improved.

Techniques described herein are directed to improving user interactions with user interface(s) associated with a content service provider and, accordingly, improving user interactions with the content service provider. In at least one example, techniques described herein are directed to determining data associated with individual users (i.e., user data). Such data may indicate how long individual users have subscribed to the content service provider, how frequently individual users interact with the content service provider, how individual users interact with content items associated with the content service provider (e.g., what content item(s) individual users interact with, what content type(s) individual users interact with, what content topic(s) and/or category(s) individual users interact with, types of actions and/or inactions, etc.), how individual users interact with other users via the content service provider, etc. Such data may be utilized to determine states of individual users. Additionally, demographic data associated with individual users may be utilized to determine states of individual users. That is, in at least one example, demographic data associated with a user, data indicative of actions performed by the user, data indicative of inaction (i.e., actions not performed) by the user, etc. may be utilized to determine a state of a user. For the purpose of this discussion, a state may correspond to a classification of a user (e.g., new, dormant, resurrected, casual, core, diverse, non-diverse, etc.) based on user data. In some examples, a state may be representative of a sophistication level of a user relative to services offered by the content service provider. Additional details associated with determining states of users are described herein.

In at least one example, techniques described herein are directed to determining an intent of a user. In some examples, techniques described herein may determine the intent of a user based on user interactions with user interface(s) (e.g., GUI(s)) and/or the content service provider. For instance, techniques described herein include determining an intent of a user based on an entry point of the user, one or more actions of the user, etc. For the purpose of this discussion, an entry point may correspond to an activity of a user immediately prior to accessing the content service provided by the content service provider. Entry points may include, but are not limited to, a search result page, an application associated with the content service provider, particular features accessible via the application, an application associated with third party source(s) and/or system(s), etc. For the purpose of this discussion, actions may include, but are not limited to, scroll actions, zoom actions, pause actions, click-through actions, search actions, save actions, share actions, etc. Additional details associated with entry point(s) and/or action(s) are described herein.

Based at least in part on determining a state of a user and an intent of a user, techniques described herein are directed to determining a directive for instructing a user how to engage with the content service provider. A directive may provide one or more directions for accessing and/or using a feature associated with the content service provider. For instance, a directive may provide one or more directions for saving a content item (e.g., saving an indication of a content item), creating a collection of content items (e.g., creating a collection of indications of content items), sharing a content item with other users (e.g., sharing an indication of a content item), adding new users to follow (e.g., adding new user profiles to follow), subscribing to content collection(s) of other users, uploading new content items, etc. The directive may be customized for the user based on the state of the user and the intent of the user. That is, a directive for a new user may be associated with a less sophisticated presentation of a feature of the content service provider than a directive for a returning user. Or, a directive for a user that interacted with a content item via a first interaction may be different than a directive for a user that interacted with a content item via a second interaction. In response to determining a directive for a user, techniques described herein are directed to communicating the directive to the user. For instance, in some examples, techniques described herein may cause a graphical element to be presented via a GUI and/or a GUI to be configured such to communicate a directive to a user. Or, in additional and/or alternative examples, techniques described herein may cause a directive to be communicated to a user via an audio output, a haptic output, etc.

Techniques described herein are directed to driving interaction between users and a content service provider by intelligently generating directive(s) for prompting user(s) to interact with the content service provider. More specifically, techniques described herein are directed to intelligently presenting directives that are customized for the user to enable the user to more efficiently and/or effectively interact with the content service provider. That is, techniques described herein are directed to increasing user interaction performance and reducing user errors in interacting with GUI(s) associated with the content service provider. Such techniques reduce user frustration directed to interactions with GUI(s). Furthermore, such techniques may save mental load. For instance, techniques described herein may suggest a search query based on user activity and/or may suggest a name for a collection of content items. Accordingly, in at least one example, such techniques may enable users to more efficiently and/or effectively interact with GUI(s).

Furthermore, such techniques improve the functioning of a computing system by enabling users to have improved interactions with GUI(s) presented in association with a content service provider. Additionally, by improving interactions with GUI(s), techniques described herein may reduce network usage. That is, by providing situationally relevant directives, techniques described herein are directed to reducing user error and thereby reducing communications sent and/or received via the network. As an example, by educating a user on how to save a content item, the user need not submit an additional search query for subsequently accessing the content item. Or, by educating a user on how to access more relevant content items, the user need not continually submit search queries that are likely to return irrelevant results. Additional and/or other computational efficiencies may be imagined.

FIG. 1 illustrates an environment 100 for generating and presenting directives for facilitating user interface interactions. As illustrated, environment 100 includes device(s) 102A, 102B, 102N (collectively 102) communicatively coupled to a content service provider 104 via network(s) 106. In at least one example, the device(s) 102 may be operated by user(s) 108A, 108B, 108N (collectively 108).

Device(s) 102 may be any type of computing device such as a tablet computing device, a smart phone or mobile communication device, a laptop, a netbook or other portable computer or semi-portable computer, a desktop computing device, a terminal computing device or other semi-stationary or stationary computing device, a wearable computing device or other body-mounted computing device, an augmented reality device, etc. Details of device 102A are described herein; however, each of the device(s) 102 may be configured in a substantially same configuration. In at least one example, device 102A may include processor(s) 110 and computer readable media 112.

Processor(s) 110 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 110 can execute one or more modules and/or processes to cause the device 102A to perform a variety of functionalities, as set forth above and explained in further detail in the following disclosure. Additionally, each of the processor(s) 110 can possess its own local memory, which also can store program modules, program data, and/or one or more operating systems.

Depending on the exact configuration and type of the device 102A, the computer-readable media 112 may include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 112 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 102A. Any such non-transitory computer-readable media can be part of the device 102A.

In contrast, communication media includes computer readable instructions, data structures, program modules, or other data in a modulated data signal, such as a carrier wave, or other transmission mechanism. As defined herein, computer storage media does not include communication media.

The computer-readable media 112 can include one or more modules and data structures including, for example, a context module 114 and a presentation module 116. The one or more modules and data structures can be in the form of stand-alone applications, productivity applications, an operating system component, or any other application or software module. In at least one example, the context module 114 and the presentation module 116 may be associated with a client-side application 118 on the device 102A. The client-side application 118 may enable a user 108A to interact with the content service provider 104 via the device 102A.

The context module 114 may be configured to determine context data. In at least one example, context data is associated with interactions between a user 108A and the content service provider 104. In some examples, context data may be associated with interactions between a user 108A and a GUI presented in association with a content service provider 104. A non-limiting example of a GUI 120 is displayed via a display of device 102A. The GUI 120 includes a plurality of content items 122A, 122B, 122C, 122D. The user 108A may interact with individual of the content items 122A, 122B, 122C, 122D to interact with the content service provider 104 as described herein. In at least one example, a user 108A may interact with individual of the content items 122A, 122B, 122C, 122D via one or more actions. Non-limiting examples of actions may include a scroll action, a zoom action, a pause action, a click-through action, a search action, a save action, a share action, a screenshot action, etc. In at least one example, action(s) may be associated with particular feature(s) of the content service provider 104. As described below, a feature of the content service provider 104 may correspond to a functionality associated with the content service provider 104.

For the purpose of this discussion, a scroll action may correspond to an interaction with a GUI (e.g., GUI 120) to access one or more content items that are not currently presented via the GUI. A scroll action may be associated with various directions (e.g., up, down, left, right, etc.). In some examples, a rate of scroll (i.e., the rate at which content moves up, down, left, right, etc.) may be based on a speed of the scroll action. In at least one example, a rate of scroll may indicate a level of interest of a user 108A. That is, a rate of scroll above a threshold may indicate a level of interest below a threshold (i.e., the user is quickly scrolling content because he or she is not interested in the content items presented) and a rate of scroll below a threshold may indicate a level of interest above a threshold (i.e., the user is slowly scrolling content because he or she is interested in the content items presented).

In at least one example, a user 108A may interact with a GUI (e.g., GUI 120) such to change the size of a content item on the GUI in association with a zoom action (e.g., zoom in, zoom out). Such an action enables the user 108A to view a content item in more (or less) detail and/or access additional information about the content item. In at least one example, a user 108A may change the size of a content item by interacting (e.g., click, tap, etc.) with the content item, actuating a control or other user interface element associated with the content item, etc. In at least one example, a size of a content item on the GUI may indicate a level of interest of a user 108A. That is, a magnified content item may indicate that a user 108A is interested in the content item.

In at least one example, a user 108A may pause on and/or within a predetermined proximity of a content item presented via a GUI (e.g., GUI 120). Such an action may indicate that the user 108A is reading and/or otherwise observing information associated with the content item. In at least one example, a time period associated with the pause may indicate a level of interest of a user 108A. That is, a pause associated with a time period over a threshold may indicate that a user 108A is interested in the content item, or a pause associated with a time period below a threshold may indicate that the user 108A is not interested in the content item.

For the purpose of this discussion, a click-through action is an action that enables a user 108A to access additional content associated with a content item. In some examples, a content item presented via a GUI is representative of content that is stored at a location remote from the content service provider 104 (i.e., an external website, etc.). In such examples, the user 108A can interact with a content item to change the size of the content item and view additional information about the content item. In such examples, the content item may be associated with a control, overlay, hyperlink, etc., the actuation of which enables the user 108A to access the content at its remote location. A click-through action may correspond to the sequence of actions including zooming in to view additional information associated with a content item and actuating a control, overlay, hyperlink, etc. to access the content at its remote location. As a non-limiting example, a content item may be an image of a portion of a recipe. The user 108A may interact with the content item to zoom in to view the portion of the recipe. If the user 108A wants to access the full recipe, the user 108A may actuate a control, overlay, hyperlink, etc. to access the full recipe via a website.

A search action may be associated with a query input by the user 108A into a search feature associated with the content service provider 104. In such examples, the user 108A may input a query into a search bar, or some other user interface element, to initiate a search of content associated with the content service provider 104.

A save action may be associated with a request to save a content item to a profile associated with a user 108A. For instance, in at least one example, a user 108A may interact with a content item such to cause an indication of the content item to be mapped to, or otherwise associated with, a profile corresponding to the user 108A. In at least one example, a user 108A may save a content item by interacting (e.g., click, tap, etc.) with the content item, actuating a control or other user interface element associated with the content item, etc. In some examples, the user 108A may arrange the content items in a collection of content items. That is, a content item may be associated with one or more other content items such that upon recall by the user 108A, the content item is presented with the collection of content items via a GUI. In at least one example, the collection of content items may be associated with a same topic (e.g., cars, quotes, weddings, fashion, etc.).

For the purpose of this discussion, a share action may correspond to sharing a content item with one or more other users. For instance, user 108A may interact with a content item to share an indication of the content item with user 108B, user 108C, etc. In alternative examples, user 108A may interact with a content item to share the content item with users who do not have profiles with the content service provider 104. In at least one example, a user 108A may share a content item by interacting (e.g., click, tap, etc.) with the content item, actuating a control or other user interface element associated with the content item, etc. and indicating a user with whom to share the content item. In at least one example, user 108A may share a content item via the content service provider 104 and/or via one or more third party applications (e.g., a messaging application, a social media application, an email application, etc.).

A screenshot action may correspond to an action of capturing an image of a content item by capturing an image of the content item as it is visible on the display of device 102A. For the purpose of this discussion, a screenshot may be a digital image captured by an image capturing application associated with the device 102A.

While each of the actions described above are described in the context of an action associated with a content item. In at least one example, the actions may be associated with a content item, an indication of a content item, etc.

In at least one example, the context module 114 may generate context data associated with interactions between a user 108A and individual content items. For instance, the context module 114 may generate context data indicating an action, a content item associated with the action, a time of the action, a date of the action, a geolocation associated with the action, etc. The context module 114 may send the context data to the content service provider 104.

In some examples, the context module 114 may generate context data associated with interactions between a user 108A and the content service provider 104. For instance, the context module 114 may generate context data indicating an interaction between a user 108A and a feature offered by the content service provider 104. As described above, in some examples, a feature may be associated with an action. In additional and/or alternative examples, a feature may be another functionality associated with the content service provider 104. Non-limiting examples of features include, but are not limited to, a search feature, a notification feature, etc. In at least one example, the context module 114 may generate context data indicating an interaction, a feature associated with the interaction, a time of the interaction, a date of the interaction, a geolocation associated with the interaction, etc. The context module 114 may send the context data to the content service provider 104.

In some examples, the context module 114 may also generate context data based on interactions between a user 108A and a device 102A. For instance, the context module 114 may generate context data indicating one or more application(s), website(s), etc. a user 108A interacts with via device 102A. Such context data may be utilized for determining an entry point. As described above, an entry point may correspond to an activity of the user 108A immediately prior to accessing the content service provider 104. Entry points may include, but are not limited to, search result page, an application associated with the content service provider 104 (e.g., client-side application 118), particular features accessible via the application (e.g., client-side application 118), an application associated with a third party source and/or system, etc.

In at least one example, the presentation module 116 may be configured to receive instructions from the content service provider 104 and present GUI(s) based at least in part on the instructions. Additionally and/or alternatively, the presentation module 116 may be configured to receive instructions from the content service provider 104 and may generate graphical elements to present via GUI(s). The graphical element(s) may be associated with directives for prompting a user 106A to interact with the GUI(s) and/or the content service provider 104. Additional details associated with presenting graphical element(s) in association with GUI(s) are described below.

In some examples, the presentation module 116 may receive instructions from the content service provider 104 and may output the instructions via an additional and/or alternative user interface. For instance, in some examples, the presentation module 116 may output instructions as an audio output, a haptic output, etc.

As described above, devices 102 may communicate with the content service provider 104. The content service provider 104 may enable users 108 to interact with content items (e.g., images, videos, etc.) via GUI(s) and/or other user interfaces. For instance, users 108 may upload content items (and/or indications thereof) to the content service provider 104 via a GUI, save content items (and/or indications thereof) associated with the content service provider 104 to personal user profiles via a GUI, sort content items (and/or indications thereof) into collections via a GUI, search for content items (and/or indications thereof) associated with the content service provider 104 via a GUI, and/or otherwise manage content items (and/or indications thereof) associated with the content service provider 104 via a GUI. In at least one example, the content service provider 104 may be associated with server(s) 124. Each of the server(s) 124 may be any type of server, such as a network-accessible server. Server(s) 124 may include processor(s) 126 and computer-readable media 128. Processor(s) 126 may be similar to processor(s) 110, as described above. Computer-readable media 128 may be similar to computer-readable media 112, described above. Computer-readable media 128 can include one or more modules and data structures including, for example, a data input module 130, a trigger event determination module 132, a state determination module 134, an intent determination module 136, a directive determination module 138, a GUI generation module 140, and a communication module 142. The one or more modules and data structures can be in the form of stand-alone applications, productivity applications, an operating system component, or any other application or software module.

The data input module 130 may be configured to determine data associated with users 108 and/or user interactions with the content service provider 104. In at least one example, the data input module 130 may receive data from devices 102 and determine user data based on the data received from such devices 102. For instance, the data input module 130 may receive context data, as described above. In at least one example, the data input module 130 may receive context data in near real-time, at a particular frequency, etc. In some examples, context data may be mapped to, or otherwise associated with, a user profile in the data store 146 that is associated with user 108A to which the context data pertains.

In at least one example, the data input module 130 may receive data indicating personal information associated with users 108 (i.e., user data) from devices 102. For instance, the data input module 130 may receive data indicating a name of a user 108, a preferred user name of the user 108A, contact information associated with the user 108A (e.g., phone number, email address, etc.), birthdate of the user 108A, preferences of the user 108A (e.g., push notifications, email notifications, content preference(s) (e.g., content items, types of content items, topics and/or categories of content items, etc.), etc.), interests of the user 108A, etc. In at least one example, such data may be mapped to a corresponding user profile in the data store 146.

In additional and/or alternative examples, the data input module 130 may receive data associated with users 108 (i.e., user data) from third party sources or systems and may determine user data based on the data received from the third party sources or systems. For instance, the data input module 130 may receive data from a social media service provider, an email service provider, a messaging service provider, etc. Such data may indicate social connections of a user 108A, interests of the user 108A, recently visited physical locations (e.g., geolocations) or virtual locations (e.g., webpages) of a user 108A, etc. In at least one example, such data may be mapped to a corresponding user profile in the data store 146.

Moreover, in some examples, the data input module 130 may determine additional and/or alternative data associated with users 108 (i.e., user data). For instance, the data input module 130 may determine a length of time that a profile associated with a user 108A has been active with the content service provider 104 (e.g., a length of time that has lapsed since the user 108A first began using the content service provider 104), a number of interactions between the user 108A and content items and/or features of the content service provider 104, a frequency with which the user 108A interacts with content items and/or features of the content service provider 104 (e.g., a number of times that the user 108A interacts with the content service provider 104 within a specified period of time), types of interactions between the user 108A and content items and/or features of the content service provider 104, a number of users that follow the user 108A, a number of users that the user 108A follows, etc. For the purpose of this discussion, a user (e.g., user 108A) may follow another user (e.g., user 108B) such that user 108A may view at least some of user 108B's interactions with the content service provider 104. For instance, user 108A may be able to see what content item(s) user 108B saves, which collections user 108B saves the content items to, etc. The data input module 130 may determine such data based at least in part on context data received from a device 102A operated by the user 108A. In at least one example, such data may be mapped to a corresponding user profile in the data store 146.

The trigger event determination module 132 may be configured to access context data from the data input module 130 and may process the context data to determine an occurrence of a trigger event. For the purpose of this discussion, a trigger event may correspond to an event indicating an opportunity to present a directive. In at least one example, an occurrence of a trigger event may correspond to a determination that a user 108A is interested in a particular content item. Such a determination may be based on context data indicating that a user 108A pauses on or within a threshold distance of the particular content item while interacting with a GUI, or that a user 108A clicks on a particular content item (i.e., to magnify the particular content item). Or, an occurrence of a trigger event may correspond to a determination that a user 108A is not engaging with the content service provider 104. Such a determination may be based on context data indicating that the user 108A is not interacting with any content items and/or user interface elements after a threshold period of time, a threshold number of sessions, a threshold number of interactions, etc. In some examples, an occurrence of a trigger event may correspond to a length of a click-through action relative to a threshold period of time. That is, if a user 108A accesses a remotely located content item corresponding to a content item by interacting with the content item presented via a GUI and returns back to the GUI in a period of time that is below a threshold period of time, the trigger event determination module 132 may determine an occurrence of a trigger event. Or, if a user 108A accesses a remotely located content item corresponding to a content item by interacting with the content item presented via a GUI and returns back to the GUI in a period of time that is above a threshold period of time, the trigger event determination module 132 may determine an occurrence of a trigger event.

In at least one example, the trigger event determination module 132 may access and/or receive an indication of a trigger event and the trigger event determination module 132 may determine the trigger event based on the indication. In such examples, an agent (e.g., an employee, an independent contractor, etc.) of the content service provider 104 may access context data and may manually determine an occurrence of a trigger event. In such examples, the agent may provide instructions indicative of a trigger event to the trigger event determination module 132.

In an additional and/or alternative example, the trigger event determination module 132 may determine an occurrence of a trigger event via a model trained utilizing a machine learning mechanism, a heuristic technique, or some combination thereof. A machine learning mechanism may build, modify, or otherwise utilize a model that is created from example inputs and makes predictions or decisions regarding an occurrence of a trigger event. In at least one example, the model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. As a result of training the model, the model may be applied to context data associated with a user 108A and may output a prediction of an occurrence of a trigger event. As described above, in some examples, a heuristic technique and/or a combination of a model trained utilizing a machine learning mechanism and a heuristic technique may be utilized to determine an occurrence of a trigger event.

The state determination module 134 may be configured to determine a state of a user 108A based at least in part on data associated with the user 108A (e.g., user data). As described above, a state may correspond to a classification of a user (e.g., new, dormant, resurrected, casual, core, diverse, non-diverse, etc.) based on user data. For the purpose of this discussion, a new user may be a user that sets up a profile with the content service provider 104 and has little to know knowledge about the content service provider 104. A dormant user may be a user that has a profile with the content service provider 104 but has not interacted with the content service provider 104 for more than a threshold period of time. A resurrected user may be a user that has previously had a profile with the content service provider 104, used the profile for more than a threshold period of time, and returned after a period of dormancy. A casual user may be a user that interacts with the content service provider 104 at a frequency above a threshold and, on average, spends less than a threshold period of time interacting with the content service provider 104. A core user may be a user that interacts with the content service provider 104 at a frequency above a threshold and, on average, spends more than a threshold period of time interacting with the content service provider 104. A diverse user may be a user that interacts with more than a threshold number of diverse content items associated with the content service provider 104 (e.g., types of content items, topics and/or categories of content items, etc.). A non-diverse user may be a user with less than a threshold number of uses for the content service provider 104. Additional and/or alternative states may be imagined. In at least one example, the state determination module 134 may determine more than one state associated with a user 108A.

In at least one example, the state determination module 134 may access and/or receive an indication of a state of a user 108A and the state determination module 134 may determine the state of the user 108A based on the indication. In such examples, an agent (e.g., an employee, an independent contractor, etc.) of the content service provider 104 may access user data and may manually determine a state of the user 108A. In such examples, the agent may provide an instruction indicative of the state of the user 108A to the state determination module 134. As a non-limiting example, an agent (e.g., an employee, an independent contractor, etc.) may access user data indicating that a user 108A is associated with a profile and the user 108A has not interacted with the content service provider 104 for a specified number of days (i.e., as indicated by a lack of context data associated with the profile). Accordingly, the agent may determine that the user 108A is a dormant user. That is, the agent may indicate to the state determination module 134 a dormant user state associated with the user 108A.

In additional and/or alternative examples, the state determination module 134 may determine a state of a user 108A via a model trained utilizing a machine learning mechanism, a heuristic technique, or some combination thereof. A machine learning mechanism may build, modify, or otherwise utilize a model that is created from example inputs and makes predictions or decisions regarding a state of a user 108A. In at least one example, the model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the model may be trained based on user data associated with a plurality of users (e.g., users 108), which may or may not include user data associated with a particular user 108A. As a result of training the model, the model may be applied to user data associated with a user 108A and may output a prediction regarding the state of the user 108A. As described above, in some examples, a heuristic technique and/or a combination of a model trained utilizing a machine learning mechanism and a heuristic technique may be utilized to determine the state of the user 108A.

As a non-limiting example, the state determination module 134 may access user data associated with a user 108A indicating that the user 108A is associated with a profile. Additionally, the state determination module 134 may access user data and/or context data associated with the user 108A which indicates that the user 108A has several collections of content items directed to different topics, the user 108A interacts with the content service provider 104 at a frequency above a threshold, and that, on average, the user 108A interacts with the content service provider 104 for an amount of time above a predetermined threshold. As a result, the state determination module 134 may determine that the user 108A is a core user and/or a diverse user. Accordingly, the state determination module 134 may output an indication that the user 108A is associated with a core user state and/or a diverse user state.

The intent determination module 136 may be configured to determine an intent of a user 108A based at least in part on context data associated with the user 108A. In at least one example, the intent determination module 136 may determine the intent of a user 108A responsive to the trigger event determination module 132 determining an occurrence of a trigger event. That is, in such examples, the intent determination module 136 may determine an intent of a user 108A at the trigger event or at a predetermined period of time prior to the trigger event based at least in part on associated context data. The intent determination module 136 may determine intent based on entry point(s), action(s), type(s) of content item(s), etc.

In at least one example, entry point(s) may be associated with particular intents. For instance, an entry point corresponding to a search result page may indicate an intent to access a particular content item (i.e., associated with a previously submitted query). Or, an entry point corresponding to a feature associated with an application (e.g., client-side application 118) associated with the content service provider 104 (e.g., a notification, a shared content item, etc.) may indicate an intent to access the content item associated with the feature. For instance, an entry point corresponding to a notification associated with a particular content item may indicate an intent to access the particular content item. Or, an entry point corresponding to a shared content item may indicate an intent to access the particular content item. Additionally and/or alternatively, an entry point associated with an opening of the application (e.g., client-side application 118) may indicate an intent to be entertained (e.g., browse content items, view notifications, share content items, retrieve content, etc.).

Furthermore, action(s) may indicate particular intents. For instance, a scrolling action may indicate an intent to see more content items (i.e., content items that are not currently presented via the GUI). A zoom action and/or a click-through action may indicate an intent to access additional information associated with a content item. A search action may indicate an intent to find content items associated with a particular search query. A save action may indicate an intent to save a content item for a subsequent time. A share action may indicate an intent to share a content item. A screenshot action may indicate an intent to share a content item and/or access a content item at a subsequent time.

In at least one example, combinations of actions may indicate particular intents. For instance, two or more save actions associated with content items that are associated with a particular topic may indicate an intent to create a collection of content items associated with the particular topic. Or, two or more save actions associated with content items that are associated with a particular topic may indicate an intent to access additional content items associated with the particular topic. As another example, two or more search actions (with no other action in between the search actions) may indicate an intent to view content items that are more relevant to the search than the content items that have been returned as search results.

In at least one example, interaction with a type of content item may indicate a particular intent. For instance, an interaction with a content item associated with a particular topic may indicate an intent to access more content items associated with the particular topic.

In at least one example, context data may be leveraged to determine at least one of an entry point, an action, a type of content item, etc. associated with an interaction between a user 108A and the content service provider 104. Based at least in part on the entry point, the action, the type of content item, etc., the intent determination module 136 may determine an intent of the user 108A.

In at least one example, the intent determination module 136 may access and/or receive an indication of an intent of a user 108A and the intent determination module 136 may determine the intent of the user 108A based on the indication. In such examples, an agent (e.g., an employee, an independent contractor, etc.) of the content service provider 104 may access context data and may manually determine an intent of the user 108A. In such examples, the agent may provide an instruction indicative of the intent of the user 108A to the intent determination module 136. As a non-limiting example, an agent may access context data indicating that a user 108A accessed a particular content item following a search for a particular topic. Accordingly, the agent may determine that the intent of the user 108A is to access content items associated with the particular topic. Accordingly, the agent may indicate to the intent determination module 136 that the intent of the user 108A is to access content items associated with the particular topic.

In additional and/or alternative examples, the intent determination module 136 may determine an intent of a user 108A via a model trained utilizing a machine learning mechanism, a heuristic technique, or some combination thereof. A machine learning mechanism may build, modify, or otherwise utilize a model that is created from example inputs and makes predictions or decisions regarding an intent of a user 108A. In at least one example, the model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the model may be trained based on context data associated with a plurality of users (e.g., users 108), which may or may not include context data associated with a particular user 108A. As a result of training the model, the model may be applied to context data associated with a user 108A and may output a prediction regarding the intent of the user 108A. As described above, in some examples, a heuristic technique and/or a combination of a model trained utilizing a machine learning mechanism and a heuristic technique may be utilized to determine the intent of the user 108A.

As a non-limiting example, the intent determination module 136 may access context data indicating that a user 108A accessed a particular content item following a search for a particular topic. Additionally, the context data may indicate that the user 108A conducted three subsequent searches in association with the content service provider 104 and did not interact with any other content items. As a result, the intent determination module 136 may determine that the intent of the user 108A is to find a particular content item associated with their search query.

The directive determination module 138 may be configured to determine directive(s) for prompting users 108 to interact with the content service provider 104. A directive may include one or more directions for prompting a user 108A to interact with the content service provider 104 in a meaningful and efficient manner. A directive may provide one or more directions for accessing and using particular feature(s) of the content service provider 104. As described above, a directive may be customized for a user 108A such that the directive is specific to the state of the user 108A and the intent of the user 108A.

In at least one example, the directive determination module 138 may access and/or receive instructions associated with directives and the directive determination module 138 may determine directives based on the instructions. In such examples, an agent (e.g., an employee, an independent contractor, etc.) of the content service provider 104 may access the state of the user 108A and the intent of the user 108A to determine a directive for prompting the user 108A to interact with the content service provider 104. In some examples, the agent may access context data for additional insight on determining the directive. In at least one example, the agent may access data indicative of interactions between the user 108A and previously presented directives. The agent may manually determine the directive for training the user 108A. In such examples, the agent may provide an instruction indicative of the directive to the directive determination module 138.

As a non-limiting example, the agent may access data indicating that a user 108A is a new user that has an intent to access additional information about a particular content item. For instance, context data may indicate that the user 108A accessed the content service provider via an application (e.g., client-side application 118). Based at least in part on determining the state of the user 108A and the intent of the user 108A, the agent may determine a directive for teaching the user 108A how to zoom in on a content item to access additional information and/or to click-through a content item to access content stored at a remote location. The agent may provide the directive to the directive determination module 138.

In an additional and/or alternative example, the directive determination module 138 may determine a directive via a model trained utilizing a machine learning mechanism, a heuristic technique, or some combination thereof. A machine learning mechanism may build, modify, or otherwise utilize a model that is created from example inputs and makes predictions or decisions regarding directives for training a user 108A to interact with a GUI and/or the content service provider 104. In at least one example, the model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the model may be trained based on data associated with a plurality of users (e.g., users 108), which may or may not include user data associated with a particular user 108A. In such an example, the data may indicate states of the users, intents of the users, and/or context data associated with the users. As a result of training the model, the model may be applied to data indicating a state of a user 108A, data indicating an intent of the user 108A, and, in some examples, context data associated with the user 108A, and may output a prediction regarding a directive for training the user 108A to interact with a GUI and/or the content service provider 104. In at least one example, the model may be additionally and/or alternatively applied to feedback data indicative of interactions between the user 108A and previously presented directives, which may be utilized to determine a prediction regarding a directive. As described above, in some examples, a heuristic technique and/or a combination of a model trained utilizing a machine learning mechanism and a heuristic technique may be utilized to determine a prediction regarding a directive.

As a non-limiting example, the directive determination module 138 may receive data indicating that a user 108A is associated with a casual user state and an intent to save a content item for subsequent access. For instance, context data may indicate that the user 108A accessed the content item in response to a notification provided via an application (e.g., client-side application 118). In at least one example, the directive determination module 138 may utilize the model to determine a directive to guide the user 108A through a save action. Additionally and/or alternatively, the directive determination module 138 may utilize the model to determine a directive to guide the user 108A through saving the content item to a collection of content items.

In some examples, the agent and/or the directive determination module 138 may determine directives based at least in part on actions taken by other users. In at least one example, the other users may share at least one characteristic with the user. In some examples, the agent may access data associated with other users of the content service provider 104 and may make a determination regarding a directive based on actions performed by such other users following a same trigger event. In other examples, the directive determination module 138 may leverage data associated with other users, which may be indicative of actions following a same trigger event taken by such other users, as data for training the model. In such examples, the directive determination module 138 may output a directive based at least in part on actions following a trigger event taken by such other users.

In additional and/or alternative examples, the agent and/or the directive determination module 138 may determine directives based at least in part on actions taken by the user 108A. In some examples, the agent may access data associated the user 108A and may make a determination regarding a directive based on actions performed by the user 108A following a same trigger event. In other examples, the directive determination module 138 may leverage data associated with the user 108A to train the model. In such examples, the directive determination module 138 may output a directive based at least in part on actions following a trigger event taken by the user 108A.

In at least one example, the agent and/or the directive determination module 138 may determine directives based at least in part on actions taken by other users and the user 108A. In some examples, the agent may access data associated with other users of the content service provider 104 and the user 108A and may make a determination regarding a directive based on actions performed by such other users and the user 108A following a same trigger event. In other examples, the directive determination module 138 may leverage data associated with other users and the user 108A, which may be indicative of actions following a same trigger event taken by such other users and the user 108A for training the model. In such examples, the directive determination module 138 may output a directive based at least in part on actions following a trigger event taken by such other users and the user 108A.

As described herein, in at least one example, the directive determination module 138 may determine a directive in response to the trigger event determination module 132 determining an occurrence of a trigger event. In other examples, the directive determination module 138 determine a directive at a particular frequency, after a lapse in a predetermined period of time, etc.

In at least one example, the directive determination module 138 may receive data indicative of interactions between user(s) 108 and previously presented directives. The directive determination module 138 may determine feedback data based on such data. The feedback data may indicate whether a user 108A followed a previously presented directive (e.g., performed an action recommended by the directive) or ignored (or otherwise did not interact) with a previously presented directive. Or, a number of times a directive was presented before the user 108A interacted with the directive. In some examples, the machine learning mechanism described above may identify trends associated with which directives user(s) follow, ignore, etc. and may leverage such data in updating the model trained utilizing the machine learning mechanism. In some examples, the trends may be associated with a single user (e.g., user 108A) or multiple users (e.g., users 108). The directive determination module 138 may update the model trained utilizing the machine learning mechanism and/or heuristic technique(s) based on the feedback data, as described below. Furthermore, the directive determination module 138 may leverage the feedback data for determining directives, as described below. Additionally, an agent may be able to identify which directives user(s) followed, ignored, etc., and may leverage such information in making manual selections of directives.

The GUI generation module 140 may be configured to generate instructions for generating GUI(s) that may be presented via a device 108A. In at least one example, the GUI generation module 140 may access content items from the data store 146 and may determine a configuration for presenting the content items via a GUI. In some examples, the GUI generation module 140 may access content items that are mapped to, or otherwise associated with, a profile of a particular user 108A and may generate instructions for presenting the content items via a GUI. In other examples, the GUI generation module 140 may access content items associated with other users that the particular user 108A follows and may generate instructions for presenting the content items via a GUI. In additional and/or alterative examples, the GUI generation module 140 may access content items associated with other users that are similar to the particular user (e.g., user 108A). That is, the GUI generation module 140 may determine one or more other users that share at least one characteristic with the particular user (e.g., user 108A), and may access content items associated with the one or more other users. Furthermore, in at least one example, the GUI generation module 140 may access content items in response to receiving a query for content items.

Additionally, the GUI generation module 140 may be configured to generate instructions for presenting directives output by the directive determination module 138. In at least one example, the GUI generation module 140 may generate instructions for presenting a graphical element via the GUI. The GUI generation module 140 may generate instructions indicating a design of a graphical element, a position of a graphical element on the GUI, and/or a timing for presenting a graphical element via the GUI. For instance, the GUI generation module 140 may access a structure of the GUI to determine how to position a graphical element to avoid obstructing content items on the GUI. Additionally, the GUI generation module 140 may determine a time for presenting a graphical element—either for an initial presentation or for a subsequent presentation (e.g., after a user dismisses a graphical element or otherwise does not take a suggested action). In at least one example, the GUI generation module 140 may leverage one or more policies to determine the position and/or timing associated with presenting a graphical element. Non-limiting examples of graphical elements that may be presented via the GUI are described below with reference to FIGS. 5A-5F.

In additional and/or alternative examples, the GUI generation module 140 may be configured to generate instructions for causing changes to a GUI to convey a directive. For instance, in some examples, the GUI generation module 140 may generate instructions to cause one or more aspects (e.g., content item(s), user interface element(s), etc.) of the GUI to be deemphasized and one or more other aspects to be emphasized. For instance, as a non-limiting example, user interface element(s) that are irrelevant to a directive may be deemphasized and user interface element(s) that are relevant to the directive may be emphasized such to draw attention to the user interface element(s). By interacting with the emphasized user interface element(s), a user 108A may receive directive(s) for interacting with the content service provider 104. Additionally and/or alternatively, the GUI generation module 140 may generate instructions for rearranging content items on a GUI based on a directive. In such an example, rearranging content items may guide a user 108A to take a particular action that is consistent with a directive. Or, in some examples, the GUI generation module 140 may generate instructions for hiding user interface element(s). Non-limiting examples of such changes to the GUI are described below with reference to FIGS. 6A-6D.

While the description above is directed to the GUI generation module 140 determining graphical elements for graphically presenting directives, in additional and/or alternative embodiments, the GUI generation module 140 may determine instructions for presenting directives via other output mechanisms (e.g., audio, haptic, etc.), as described above.

The communication module 142 may be configured to exchange data with the devices 108. In at least one example, the communication module 142 may be configured to send instructions for generating a GUI to a device 108A. In an additional and/or alternative example, the communication module 142 may be configured to send instructions for generating and presenting a graphical element associated with a directive determined by the directive determination module 138. As described above, the presentation module 116 may present a graphical element via a GUI based at least in part on the instructions received from the communication module 142. A non-limiting example of a graphical element 144 graphically presenting a directive is illustrated in FIG. 1.

The server(s) 124 may be associated with a data store 146, as described above. The data store 146 may store data so that it is updatable, organizable, and manageable. In at least one example, the data store 146 may be integrated in the server(s) 124. In other examples, the data store 146 may be communicatively coupled to the server(s) 124. In at least one example, the data store 146 may store user profile(s) 148, content 150, and/or policy(s) 152.

User profile(s) 148 may store data associated with user(s) 108 that have profile(s) with the content service provider 104. A user profile of the user profile(s) 148 may store data indicating a name of a user 108A, a preferred user name of the user 108A, contact information associated with the user 108A (e.g., phone number, email address, etc.), birthdate of the user 108A, preferences of the user 108A (e.g., push notifications, email notifications, content preference(s) (e.g., content items, types of content items, topics and/or categories of content items, etc.) etc.), interests of the user 108A, etc. Additionally, context data associated with previous interactions between the user 108A and the content service provider 104 may be mapped to, or otherwise associated with, the user profile. For instance, context data may indicate a number of interactions between the user 108A and the content service provider 104, types of interactions between the user 108A and the content service provider 104, a number and/or an identity of other users that follow the user 108A, a number and/or an identity of other users that the user 108A follows, etc. Furthermore, data associated with interactions between the user 108A and previously presented directives may be mapped to, or otherwise associated with, the user profile. In at least one example, a determined state of a user 108A may be mapped to, or otherwise associated with, a user profile corresponding to the user 108A. In at least one example, content item(s) saved by the user 108A may be mapped to, or otherwise associated with, a user profile. In some examples, content item(s) saved by the user 108A may be arranged in collections of content items, as described above.

Content 150 may store content items uploaded by user(s) 108 and/or accessed via the content service provider 104. As described above, a content item may correspond to an image, a video, etc. In some examples, a content item may be an indication and/or a representation of a content item that is otherwise stored at a remote location, as described above. In at least one example, content items stored in the content 150 may be provided by users 108 (i.e., by an upload feature of the content service provider 104). In additional and/or alternative examples, content items stored in the content 150 may be provided by third party sources and/or systems. In some examples, content items stored in the content 150 may be accessed by agents (e.g., an employee, an independent contractor, etc.) of the content service provider 104 and may be manually added to the content 150. In at least one example, content items in the content 150 may be mapped to, or otherwise associated with, one or more user profiles 148. In additional and/or alternative examples, a content item may be mapped to, or otherwise associated with, another content item (i.e., a collection of content items), and the content items may be mapped to, or otherwise associated with, a user profile.

Policy(s) 152 may store one or more policies associated with presenting directive(s) via user interface(s). The one or more policies may be utilized to manage and prevent conflicts between presenting multiple directives via a same GUI. Additionally and/or alternatively, the one or more policies may be utilized to prevent over providing directives, such to mitigate spam and/or user frustration. In some examples, the policy(s) 152 may be updated based at least in part on feedback data indicative of interactions between user(s) 108 and previously presented directives. For instance, the policy(s) 152 may prioritize directives that the feedback data indicates are more successful in effectuating action over other directives that are less successful in effectuating action (per the feedback data).

In at least one example, the one or more policies may indicate that a single (or other predetermined number) graphical element may be presented via the GUI at a time. In some examples, the one or more policies may indicate how to present graphical elements, in view of cultural considerations, design considerations, attributes of the user devices 102, etc. Or, the one or more policies may indicate where to present a graphical element. Furthermore, the one or more policies may indicate one or more states of user(s) to exclude from receiving directives. In some examples, the one or more policies may indicate a timing associated with presenting graphical elements associated with directives.

For instance, the one or more policies may indicate a number of directives that may be presented to a user 108A per predetermined time period (e.g., hour, day, week, etc.), a frequency in which directives may be presented, etc. Or, the one or more policies may indicate how long to present a graphical element prior to dismissing the graphical element. The one or more policies may indicate a number of times that a graphical element may be dismissed before the graphical element is to be permanently dismissed.

As described above, device(s) 102 may communicate with the content service provider 104 via network(s) 106. Network(s) 106 may be any type of network known in the art, such as a local area network or a wide area network, such as the Internet, and may include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 106 may include both wired and/or wireless communication technologies, including Bluetooth®, BLE, Wi-Fi and cellular communication technologies, as well as wired or fiber optic technologies. Components used for such communications may depend at least in part upon the type of network, the environment selected, or both. Protocols for communicating over such networks are well known and will not be discussed herein in detail.

Figure 2:
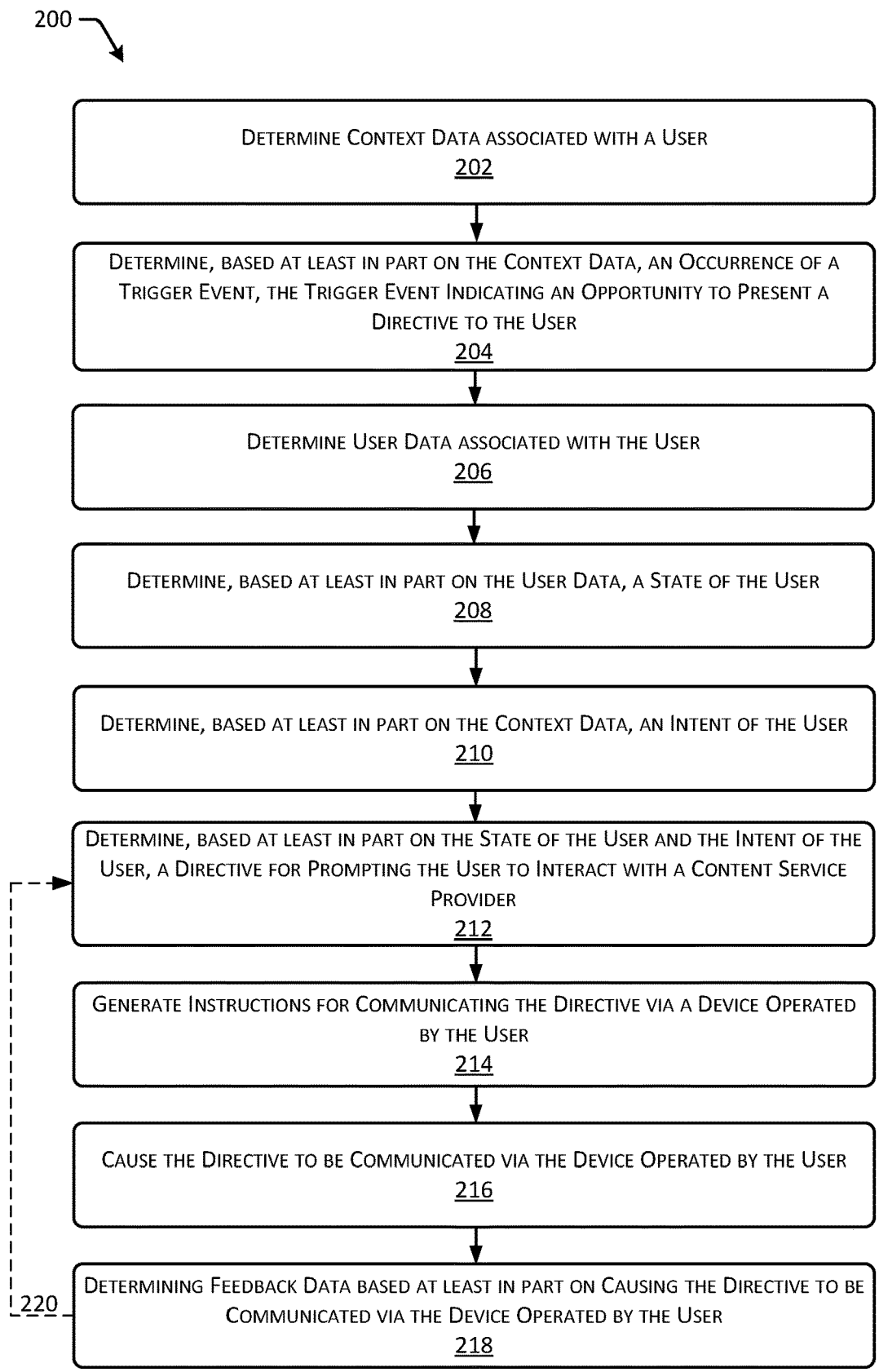
FIG. 2 illustrates an example process for determining and presenting directives for user interface interactions.
Figure 3:
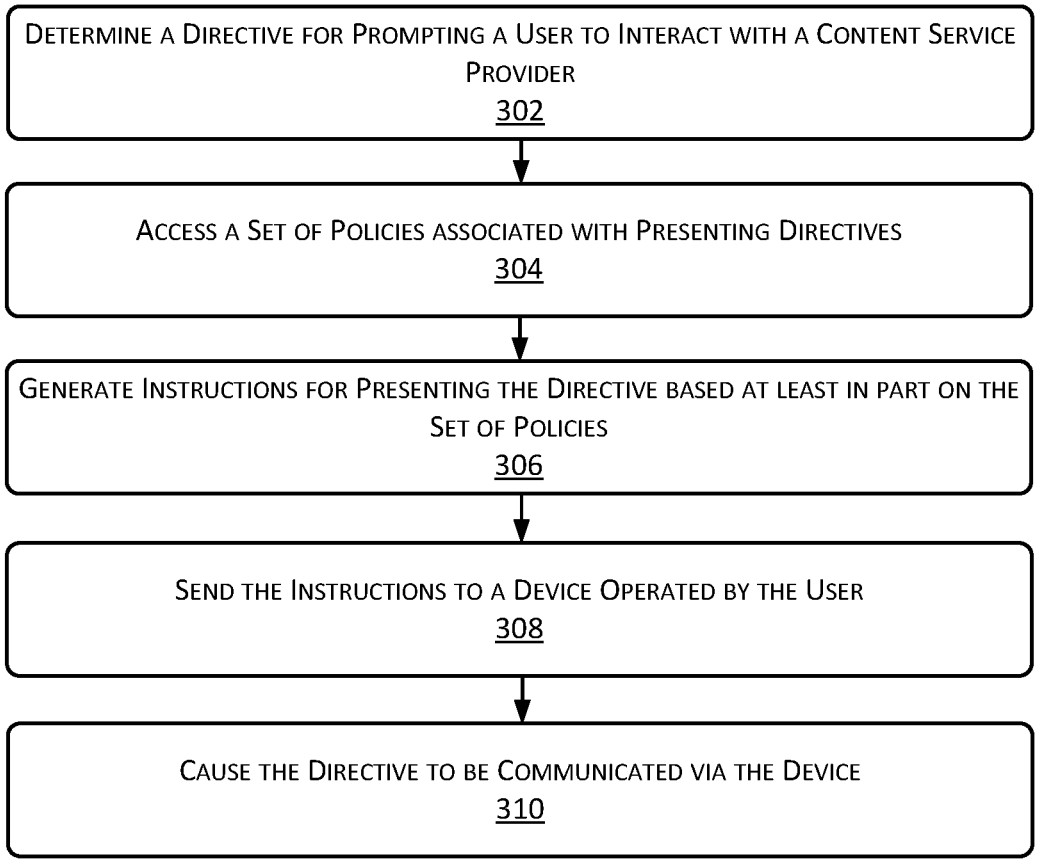
FIG. 3 illustrates an example process for determining and causing a directive for a user interface interaction to be presented via a device operated by a user.
Figure 4:
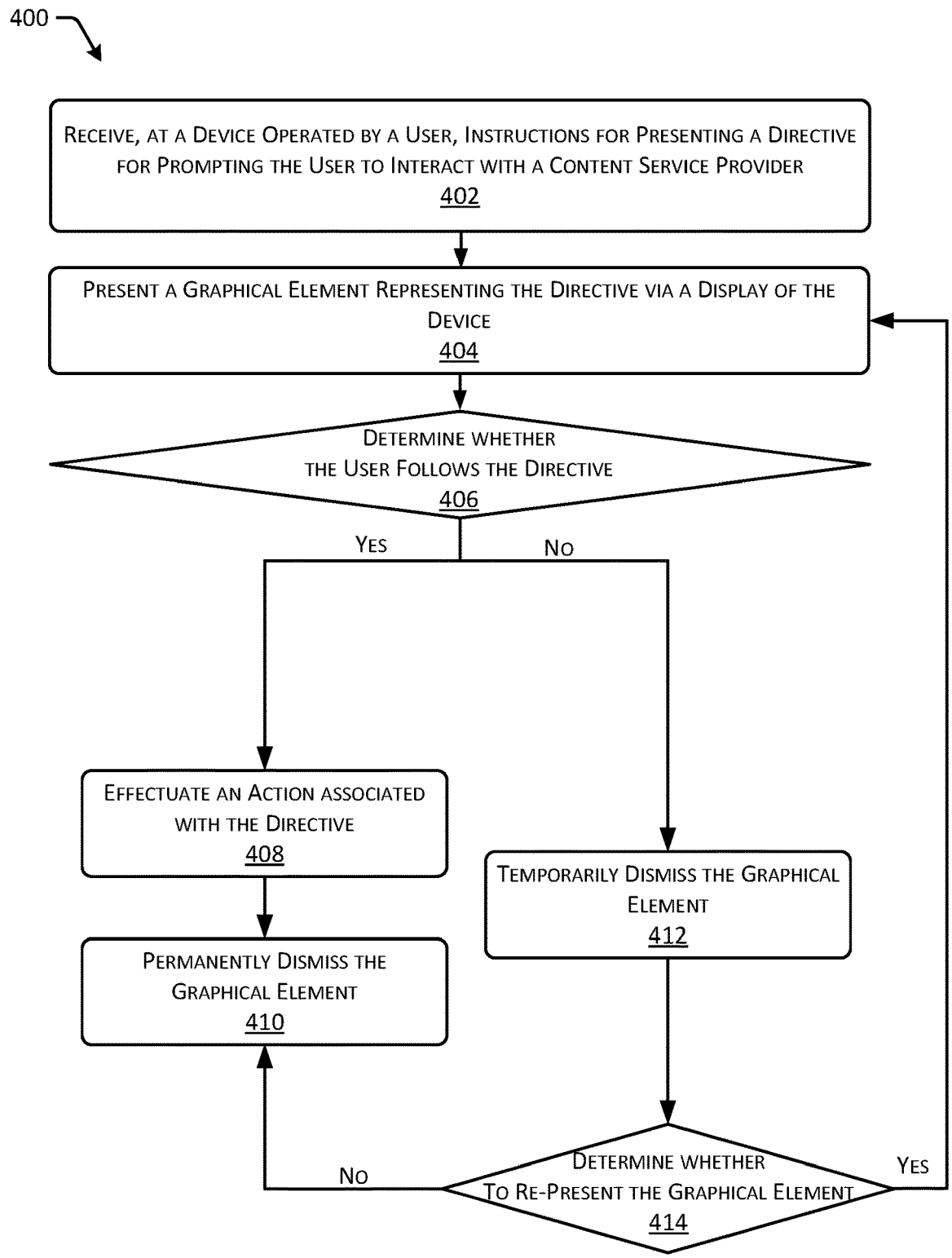
FIG. 4 illustrates an example process for presenting a directive for a user interface interaction via a device operated by a user.

FIGS. 2-4 describe example processes for determining and generating directive(s) for prompting user(s) 108 to interact with user interface(s) 120 of a content service provider 104. The example processes are described in the context of the environment of FIG. 1, but are not limited to that environment. The processes described in association with FIGS. 2-4 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, application-specific integrated circuits (ASICs), programmable circuits such as field programmable gate arrays (FPGAs), or in other ways. The order in which the operations are described is not intended to be construed as a limitation, and any number of the described operations can be combined in any order and/or in parallel to implement the processes.

FIG. 2 illustrates an example process 200 for determining and presenting directives for facilitating user interface interactions.

Block 202 illustrates determining context data associated with a user 108A. The data input module 130 may be configured to determine data associated with users 108 and/or user interactions with the content service provider 104. In at least one example, the data input module 130 may receive data from devices 102. For instance, the data input module 130 may receive context data, as described above. In at least one example, context data may be associated with interactions between the user 108A and the content service provider 104. In additional and/or alternative examples, context data may be associated with interactions between the user 108A and individual content items. Moreover, in some examples, context data may be associated with interactions between the user 108A and the content service provider 104. In additional and/or alternative examples, the context module 114 may also generate context data based on interactions between the user 108A and a corresponding device 102A.

Block 204 illustrates determining, based at least in part on the context data, an occurrence of a trigger event, the trigger event indicating an opportunity to present a directive to a user 108A. The trigger event determination module 132 may be configured to access context data from the data input module 130 and may process the context data to determine an occurrence of a trigger event. For the purpose of this discussion, a trigger event may correspond to an event indicating an opportunity to present a directive. In at least one example, the trigger event determination module 132 may access and/or receive an indication of a trigger event (i.e., from an agent), as described above, and the trigger event determination module 132 may determine a trigger event based on the indication. In an additional and/or alternative example, the trigger event determination module 132 may determine an occurrence of a trigger event via a model trained utilizing a machine learning mechanism, a heuristic technique, or some combination thereof, as described above.

Block 206 illustrates determining user data associated with the user 108A. The data input module 130 may be configured to determine data associated with users 108 and/or user interactions with the content service provider 104. In at least one example, the data input module 130 may receive data from devices 102. In at least one example, the data input module 130 may receive data indicating personal information associated with users 108 (i.e., user data) from devices 102, as described above. In some examples, the data input module 130 may determine user data based at least in part on context data received from a device 102A operated by the user 108A. In additional and/or alternative examples, user data may be mapped to a user profile in the user profile(s) 148 and the data input module 130 may access user data from the user profile.

Block 208 illustrates determining, based at least in part on the user data, a state of the user 108A. The state determination module 134 may be configured to determine a state of a user 108A based at least in part on the user data. As described above, a state may correspond to a classification of a user (e.g., new, dormant, resurrected, casual, core, diverse, non-diverse, etc.) based on user data. In at least one example, the state determination module 134 may access and/or receive an indication of a state of a user 108A (i.e., from an agent), as described above, and the state determination module 134 may determine the state of the user 108A based on the indication. In additional and/or alternative examples, the state determination module 134 may determine a state of a user 108A via a model trained utilizing a machine learning mechanism, a heuristic technique, or some combination thereof, as described above. In some examples, the state of the user 108A may be predetermined and may be mapped to, or otherwise associated with a user profile of the user 108A. In such examples, the state determination module 134 may access an indication of the state of the user 108A from a corresponding user profile.

Block 210 illustrates determining, based at least in part on the context data, an intent of the user 108A. In at least one example, context data may be leveraged to determine at least one of an entry point, an action, a type of content item, etc. associated with an interaction between a user 108A and the content service provider 104. Based at least in part on the entry point, the action, the type of content item, etc., the intent determination module 136 may determine an intent of the user 108A. In at least one example, the intent determination module 136 may access and/or receive an indication of an intent of a user 108A (i.e., from an agent), as described above, and the intent determination module 136 may determine the intent of the user 108A based on the indication. In additional and/or alternative examples, the intent determination module 136 may determine an intent of a user 108A via a model trained utilizing a machine learning mechanism, a heuristic technique, or some combination thereof, as described above. In some examples, at least a portion of the context data may be predetermined and may be mapped to, or otherwise associated with a user profile of the user 108A. In such examples, the intent determination module 136 may access such context data from a corresponding user profile.

Block 212 illustrates determining, based at least in part on the state of the user and the intent of the user, a directive for prompting the user 108A to interact with a content service provider 104. The directive determination module 138 may be configured to determine directive(s) for prompting users 108 to interact with the content service provider 104. In at least one example, the directive determination module 138 may access and/or receive instructions associated with directives (i.e., from an agent), and the directive determination module 138 may determine the directives based on the instructions. In an additional and/or alternative, the directive determination module 138 may determine a directive via a model trained utilizing a machine learning mechanism, a heuristic technique, or some combination thereof, as described above. In some examples, the agent and/or the directive determination module 138 may determine directives based at least in part on actions taken by other users, which may share at least one characteristic with the user 108A, actions taken by the user 108A, and/or actions taken by the other users and the user 108A, as described above.

Block 214 illustrates generating instructions for communicating the directive via a device 102A operated by the user 108A. The GUI generation module 140 may be configured to generate instructions for presenting directives output by the directive determination module 138. In at least one example, the GUI generation module 140 may generate instructions for presenting a graphical element via the GUI. The GUI generation module 140 may generate instructions indicating a design of a graphical element, a position of a graphical element on the GUI, and/or a timing for presenting a graphical element via the GUI. For instance, the GUI generation module 140 may access a structure of the GUI to determine how to position a graphical element to avoid obstructing content items on the GUI. Additionally, the GUI generation module 140 may determine a time for presenting a graphical element—either for an initial presentation or for a subsequent presentation (e.g., after a user dismisses a graphical element or otherwise does not take a suggested action). In at least one example, the GUI generation module 140 may leverage one or more policies to determine the position and/or timing associated with presenting a graphical element.

In additional and/or alternative examples, the GUI generation module 140 may be configured to generate instructions for causing changes to a GUI to convey a directive. Furthermore, while the description above is directed to the GUI generation module 140 determining graphical elements for graphically presenting directives, in additional and/or alternative embodiments, the GUI generation module 140 may determine instructions for presenting directives via other output mechanisms (e.g., audio, haptic, etc.), as described above.

Block 216 illustrates causing the directive to be communicated via the device 102A operated by the user 108A. In at least one example, the communication module 142 may be configured to send instructions for generating and presenting a graphical element associated with a directive determined by the directive determination module 138. As described above, the presentation module 116 may present a graphical element via a GUI based at least in part on the instructions received from the communication module 142. Non-limiting examples of graphical elements that may be presented via the GUI are described below with reference to FIGS. 5A-5F. Non-limiting examples of changes to the GUI to communicate a directive are described below with reference to FIGS. 6A-6D.

Block 218 illustrates determining feedback data based at least in part on causing the directive to be communicated via the device 102A operated by the user 108A. In at least one example, the directive determination module 138 may receive data indicative of interactions between user(s) 108 and previously presented directives. The directive determination module 138 may determine feedback data based on such data. The feedback data may indicate whether a user 108A followed a previously presented directive (e.g., performed an action recommended by the directive) or ignored (or otherwise did not interact) with a previously presented directive. Or, a number of times a directive was presented before the user 108A interacted with the directive. In some examples, the directive determination module 138 may leverage the feedback data to update the model trained utilizing a machine learning mechanism described above. For instance, the model utilized by the directive determination module 138 may be adjusted based on whether a user 108A followed or ignored previous directives. In some examples, a previous directive may be a same directive, a similar directive, or a dissimilar directive. Moreover, in some examples, heuristic technique(s) and/or the model and heuristic technique(s) (e.g., a hybrid mechanism) utilized by the directive determination module 138 may be adjusted based on whether a user 108A followed or ignored previous directives. Additionally and/or alternatively, the GUI generation module 140 may leverage the feedback data to update the policy(s) 152, as described above.

In some examples, the directive determination module 138 may aggregate feedback data that is associated with more than one user (e.g., users 108). In such examples, the model trained utilizing a machine learning mechanism and/or heuristic technique(s) utilized by the directive determination module 138 may be adjusted based on whether the multiple users (e.g., users 108) followed or ignored previous directives. The multiple users may include user 108A or, in some examples, may exclude user 108A. Additionally and/or alternatively, the GUI generation module 140 may leverage the feedback data associated with the multiple users (e.g., users 108) to update the policy(s) 152, as described above.

In at least one example, the feedback data may be utilized as an input for determining future directives, as shown by line 220. That is, in some examples, the directive determination module 138 may utilize the feedback data in addition to the state of the user 108A and/or the intent of the user 108A to determine a directive. Accordingly, in at least one example a directive may be determined based on whether the user 108A and/or one other more other users (e.g., users 108) followed or ignored previously presented directives.

FIG. 3 illustrates an example process 300 for determining and causing a directive for facilitating a user interface interaction to be presented via a device 102A operated by a user 108A.

Block 302 illustrates determining a directive for prompting a user 108A to interact with a content service provider 104, as described above with reference to FIG. 2.

Block 304 illustrates accessing one or more policies associated with presenting directives. In at least one example, the GUI generation module 140 may access one or more policies from the policy(s) 152 in the data store 146. As described above, the one or more policies may indicate that a single (or other predetermined number) graphical element may be presented via the GUI at a time. In some examples, the one or more policies may indicate how to present graphical elements, in view of cultural considerations, design considerations, device considerations, etc. Or, the one or more policies may indicate where to present a graphical element. Furthermore, the one or more policies may indicate one or more states of user(s) to exclude from receiving directives. In some examples, the one or more policies may indicate a timing associated with presenting graphical elements associated with directives. For instance, the one or more policies may indicate a number of directives that may be presented to a user 108A per predetermined time period (e.g., hour, day, week, etc.), a frequency in which directives may be presented, etc. Or, the one or more policies may indicate how long to present a graphical element prior to dismissing the graphical element. The one or more policies may indicate a number of times that a graphical element may be dismissed before the graphical element is to be permanently dismissed (or otherwise dismissed for a predetermined amount of time).

Block 306 illustrates generating instructions for presenting the directive based at least in part on the one or more policies. In at least one example, the GUI generation module 140 may generate instructions for presenting a graphical element via the GUI in view of the one or more policies.

Block 308 illustrates sending the instruction to a device 102A operated by the user 108A. In at least one example, the communication module 142 may be configured to send instructions for generating and presenting a graphical element associated with a directive determined by the directive determination module 138.

Block 310 illustrates causing the directive to be communicated via the device 102A. As described above, the presentation module 116 may be configured to receive instructions from the content service provider 104 and may cause the directive to be communicated via the device 102A based on the instructions. Non-limiting examples of graphical elements that may be presented via the GUI are described below with reference to FIGS. 5A-5F. Non-limiting examples of changes to the GUI to communicate a directive are described below with reference to FIGS. 6A-6D.

FIG. 4 illustrates an example process 400 for presenting a directive for facilitating a user interface interaction via a device operated by a user.

Block 402 illustrates receiving, at a device 102A operated by a user 108A, instructions for presenting a directive for prompting the user 108A to interact with a content service provider 104. As described above, in at least one example, the communication module 142 may be configured to send instructions for generating and presenting a graphical element associated with a directive determined by the directive determination module 138. The presentation module 116 may be configured to receive instructions from the content service provider 104 and may generate graphical elements to present via GUI(s).

Block 404 illustrates presenting a graphical element representing the directive via a display of the device 102A. In at least one example, the presentation module 116 may present the graphical element via a display of the device 102A. Non-limiting examples of graphical elements that may be presented via the GUI are described below with reference to FIGS. 5A-5F.

Block 406 illustrates determining whether the user 108A follows the directive. In at least one example, the presentation module 116 may determine whether the user 108A interacts with a content item and/or user interface element associated with the graphical element such to follow the directive presented via the graphical element. In some examples, the presentation module 116 may determine whether the user 108A interacts with a region of the GUI that is not associated with the content item and/or the user interface element associated with the graphical element such to follow the directive presented via the graphical element. Based at least in part on determining that the user follows the directive, the presentation module 116 may effectuate an action associated with the directive, as illustrated in block 408. Based at least in part on effectuating the action, the presentation module 116 may permanently dismiss the graphical element, as illustrated in block 410.

Based at least in part on determining that the user 108A does not follow the directive, the presentation module 116 may temporarily dismiss the graphical element, as illustrated in block 412. In some examples, as described below, the user 108A may interact with the content service provider 104; however, the interaction may not be consistent with the directive. For instance, the user 108A may interact with another region of the GUI, may browse to a new GUI, may exit the application (e.g., client-side application 118), etc. In such examples, the presentation module 116 may temporarily dismiss the graphical element (i.e., dismiss the graphical element for a predetermined period of time, or until a request from a user 108A to display the graphical element, etc.).

Block 414 illustrates determining whether to re-present the graphical element. Based at least in part on temporarily dismissing the graphical element, the presentation module 116 may access and/or receive an instruction indicating whether to re-present the graphical element. Based at least in part on determining that that the graphical element is to be re-presented, the presentation module 116 may present the graphical element via the display of the device 102A and process 400 may repeat from block 404. Based at least in part on determining that the graphical element is not to be re-presented, the presentation module 116 may permanently dismiss the graphical element, as illustrated in block 410.

In at least one example, the presentation module 116 may send data indicating whether the user 108A follows a directive to the directive determination module 138. As described above, the directive determination module 138 may generate feedback data based on such data. The feedback data may be used to update the model trained utilizing the machine learning mechanism and/or heuristic technique(s) utilized by the directive determination module 138 and/or the policy(s) 152, as described above.

FIGS. 5A-5F illustrate examples of a GUI 500 presented via a display 502 of a device 102A. As described above, GUI 500 may present a plurality of content items (e.g., content item 504A, content item 504B, content item 504C, content item 504D, etc.). As described above, a content item (e.g., content item 504A) may be an image, video, etc. In some examples, a content item (e.g., content item 504A) may represent a content item that is stored at a location remote from the content service provider 104. GUI 500 may include user interface elements (e.g., user interface element 506A, user interface element 506B, user interface element 506C, user interface element 506D, etc.). In at least one example, a user interface element (e.g., user interface element 506A) may be associated with an action. For instance, user interface element 506A may be associated with a control, the actuation of which enables a user 108A to save the corresponding content item 504A. Each content item 504A-504D is illustrated as being associated with a single user interface element 506A-506D, respectively; however, a content item (e.g., content item 504A) may be associated with any number of user interface elements. In an example where a content item (e.g., content item 504A) is associated with more than one user interface element, each user interface element may be associated with a different action. For instance, a first user interface element may be associated with a save action, a second user interface element may be associated with a share action, etc. In some examples, one or more user interface elements may be associated with the GUI 500 to enable a user 108A to interact with the GUI 500.

Figure 5B:
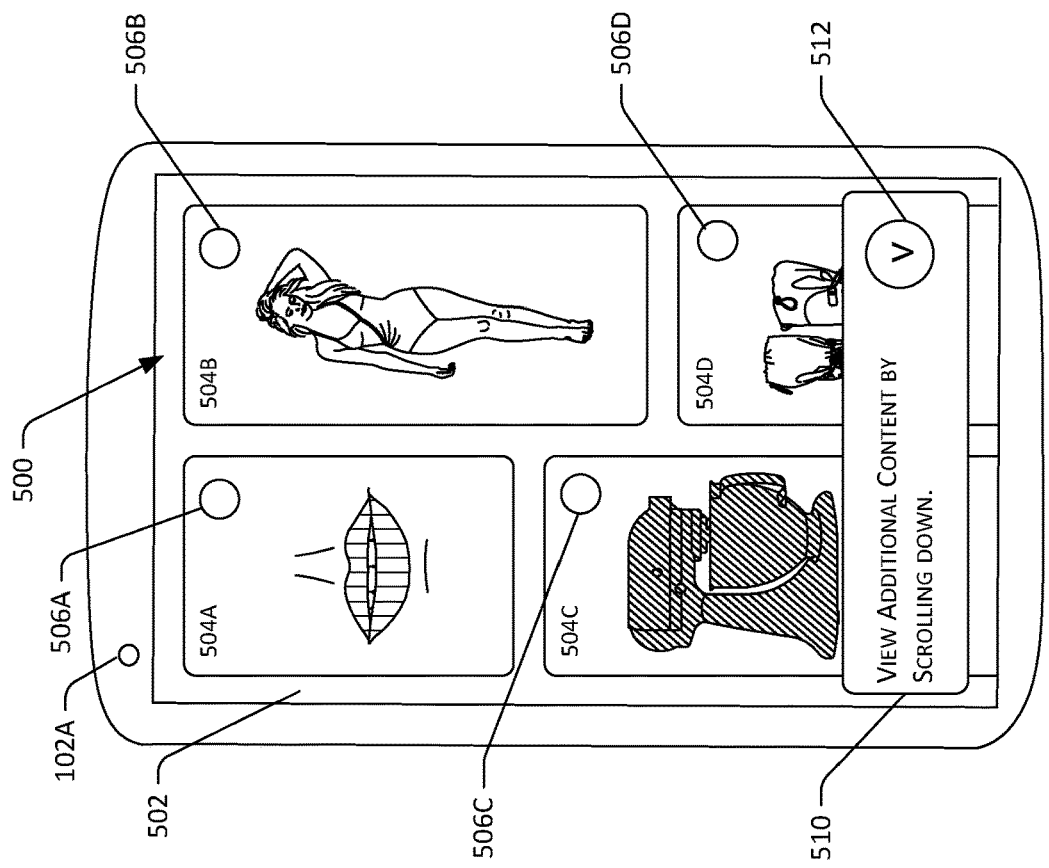
Figure 5A:
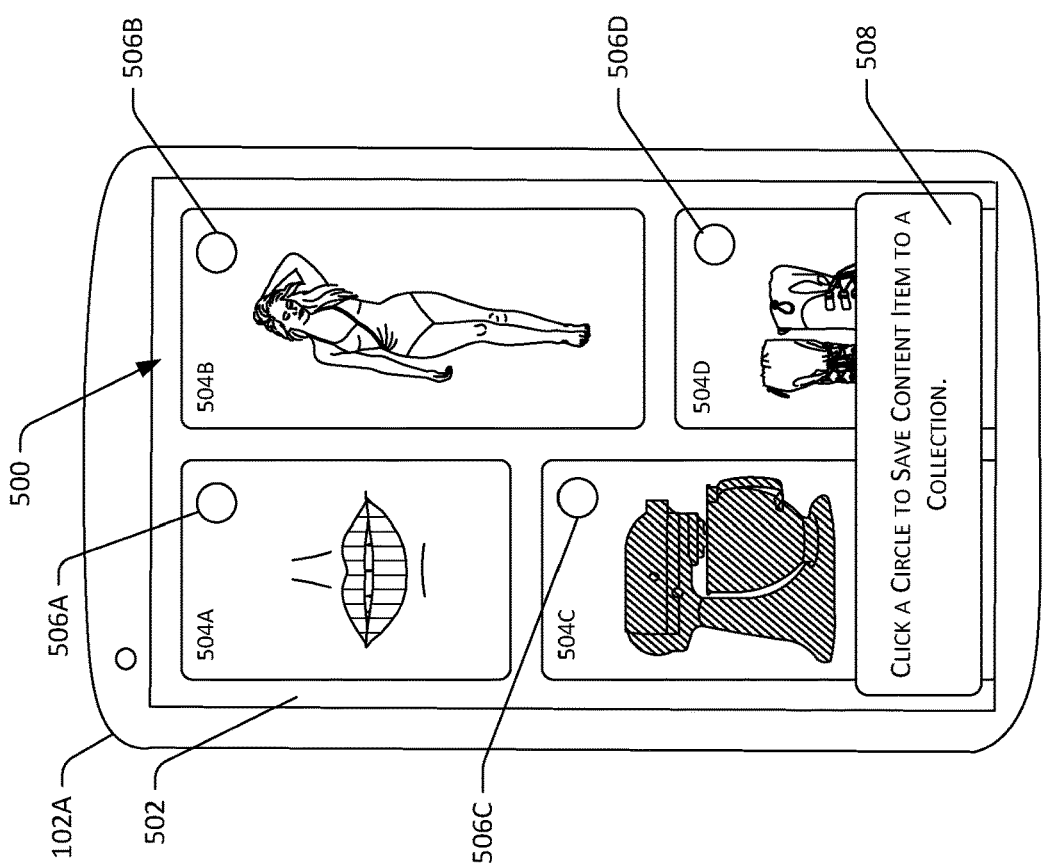

FIG. 5A illustrates an example of a graphical element 508 that may be presented via the GUI 500. In at least one example, the presentation module 116 may present a graphical element 508 representing a directive via GUI 500, which may not be associated with any particular content item or user interface element (i.e., the graphical element 508 may be associated with the GUI 500 generally). The graphical element 508 may provide a directive for prompting a user 108A to interact with the GUI 500. In at least one example, the graphical element 508 may be presented such that a user 108A may interact with content items (e.g., content items 504A-504D) and/or user interface elements on the GUI 500. That is, the graphical element 508 may be non-blocking. Additionally, in at least one example, the graphical element 508 may be presented such that a user 108A may scroll through content items (e.g., content items 504A-504D). In such an example, the graphical element 508 may remain in a fixed location on the GUI 500 until the graphical element 508 is dismissed and/or the graphical element 508 is no longer presented via the GUI 500, as described below.

In at least one example, the graphical element 508 may be associated with a control, the actuation of which may trigger an action. In such an example, a user 108A may interact with the graphical element 508 to trigger an action. In response to the interaction, the presentation module 116 may effectuate the action and dismiss the graphical element 508. That is, the presentation module 116 may send an indication to the content service provider 104 to effectuate the action and may cause the graphical element 508 to be removed from the GUI 500. In some examples, the graphical element 508 may persist even after the user 108A interacts with the graphical element 508.

In some examples, a user 108A may view the directive presented via the graphical element 508 and may perform the action by interacting with a region of the GUI 500 that is not associated with the graphical element 508. In such examples, the presentation module 116 may effectuate the action and dismiss the graphical element 508. That is, the presentation module 116 may send an indication to the content service provider 104 to effectuate the action and may cause the graphical element 508 to be removed from the GUI 500.

Additionally and/or alternatively, a user 108A may perform a gesture (e.g., a swipe, tap, etc.) in association with the graphical element 508, or interact with the graphical element 508 in some other manner, such to dismiss the graphical element 508 without taking any action as suggested via the graphical element 508. In some examples, the graphical element 508 may be configured to be dismissed without any user interaction. That is, in at least one example, the presentation module 116 may dismiss the graphical element 508 after a lapse of a predetermined period of time, etc. Additionally and/or alternatively, the presentation module 116 may determine that a user 108A navigates away from the GUI 500 and may not present the graphical element 508 if (or when) the user 108A navigates back to the GUI 500.

FIG. 5B illustrates another example of a graphical element 510 that may be presented via the GUI 500. In at least one example, a graphical element 510 may include an indicator 512, which may indicate that additional information is associated with another view and/or experience. In some examples, the graphical element 510 may suggest an action for the user (e.g., 108A) (i.e., scroll down). In at least one example, the indicator 512 may be associated with a control. A user 108A may actuate the control to interact with the GUI 500. For instance, in at least one example, the user 108A may actuate a control to access additional content item(s), view another GUI, view other information, etc. In some examples, actuation of the control may cause an overlay to be presented via the GUI 500 or may cause a new GUI to be presented.

Graphical element 510, like graphical element 508, may be dismissed based on user interaction with the graphical element 510, user interaction with a different region of the GUI 500, or based on the presentation module 116 dismissing the graphical element 510, as described above.

While graphical elements 508 and 510 each present a directive, in additional and/or alternative examples, graphical elements 508 and/or 510 may present general information, a confirmation of an action, an article, etc. Furthermore, in some examples, graphical elements 508 and/or 510 may include an illustration, an animation, or some other visual means for instructing a user 108A.

Figure 5D:
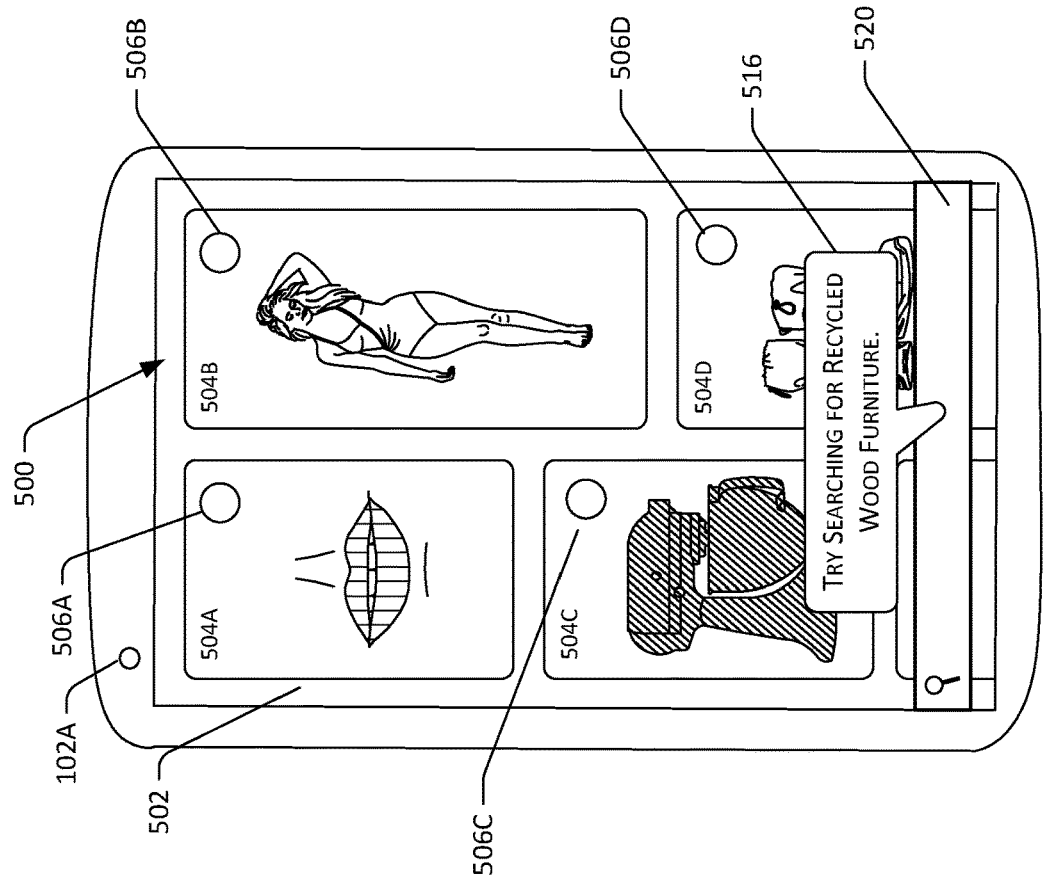
Figure 5C:
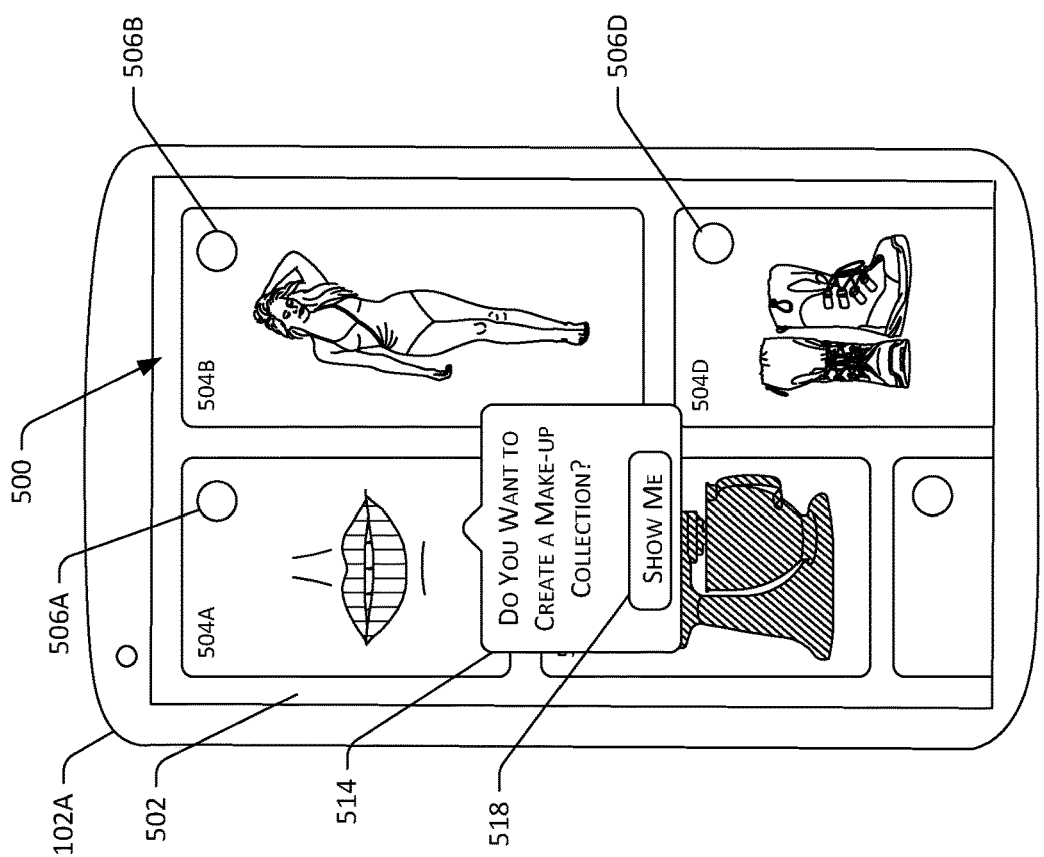

FIG. 5C illustrates another example of a graphical element 514 that may be presented via the GUI 500. In at least one example, the presentation module 116 may present a graphical element 514 graphically representing a directive via GUI 500. In such an example, the graphical element 514 may be associated with a particular content item (e.g., content item 504A). In additional and/or alternative examples, a graphical element, such as graphical element 516, may be associated with a user interface element, as described below with reference to FIG. 5D. In at least one example, the graphical element 514 may be designed to point to the particular content item (e.g., content item 504A) such to draw the attention of the user 108A to the particular content item (e.g., content item 504A) and suggest an action associated with the particular content item (e.g., content item 504A). In additional and/or alternative examples, the graphical element 514 may be designed to point to the particular content item (e.g., content item 504A) such to draw the attention of the user 108A to the particular content item (e.g., content item 504A) and communicate information associated with the particular content item (e.g., content item 504A).

In at least one example, the graphical element 514 may be presented such that a user 108A may interact with content items (e.g., content items 504A-504D) and/or user interface elements on the GUI 500. That is, the graphical element 514 may be non-blocking. Additionally, in at least one example, the graphical element 514 may be presented such that a user 108A may scroll through content items (e.g., content items 504A-504D). In such an example, the graphical element 514 may remain fixed to the particular content item (e.g., content item 504A) until the graphical element 514 is dismissed and/or the particular content item (e.g., content item 504A) is no longer presented via the GUI 500.

In at least one example, the graphical element 514 may provide a directive for prompting a user 108A to interact with the particular content item (e.g., content item 504A). In at least one example, the graphical element 514 may be associated with a control, the actuation of which may trigger an action and/or launch a follow-up experience for completing the action. In some examples, the control may be associated with the entire graphical element 514 and, in other examples, the control may be associated with an action control 518. In at least one example, a user 108A may interact with the graphical element 514 and/or the action control 518 to trigger an action and/or launch a follow-up experience. In at least one example, in response to the interaction, the presentation module 116 may effectuate the action and/or the follow-up experience and dismiss the graphical element 514. That is, the presentation module 116 may send an indication to the content service provider 104 to effectuate the action and/or the follow-up experience and may cause the graphical element 514 to be removed from the GUI 500. In additional and/or alternative examples, in response to the interaction, the presentation module 116 may present additional content item(s), another GUI, other information, etc. In some examples, actuation of the control 518 may cause an overlay to be presented via the GUI 500 or may cause a new GUI to be presented.

In at least one example, a user 108A may view the directive presented via the graphical element 514 and may perform the action associated with the directive by interacting with a region of the GUI 500 that is not associated with the graphical element 514. In such examples, the presentation module 116 may effectuate the action and dismiss the graphical element 514. That is, the presentation module 116 may send an indication to the content service provider 104 to effectuate the action and may cause the graphical element 514 to be removed from the GUI 500.

Additionally and/or alternatively, a user 108A may perform a gesture (e.g., a swipe, tap, etc.) in association with the graphical element 514 such to dismiss the graphical element 514 without taking any action as suggested by the graphical element 514. In some examples, a graphical element 514 may be configured to be dismissed without any user interaction. That is, in at least one example, the presentation module 116 may dismiss the graphical element 514 after a lapse of a predetermined period of time, etc. Additionally and/or alternatively, the presentation module 116 may determine that a user 108A navigates away from the GUI 500 and may not present the graphical element 514 if (or when) the user 108A navigates back to the GUI 500. Or, if the particular content item (e.g., content item 504A) is no longer in view, the presentation module 116 may dismiss the graphical element 514.

In some examples, graphical element 514 may not be dismissed until the user 108A completes the action or dismisses the graphical element 514. That is, in such examples, the presentation module 116 may not dismiss the graphical element 514 based on the user 108A interacting with another region of the GUI 500.

FIG. 5D illustrates an example of a graphical element 516 that may be presented via the GUI 500. In FIG. 5D, the graphical element 516 may be associated with a user interface element 520. As a non-limiting example, the user interface element 520 may correspond to a search feature (i.e., a search bar), as shown in FIG. 5D. Like graphical element 514, in at least one example, graphical element 516 may be designed to point to user interface element 520 such to draw the attention of the user 108A to the particular user interface element 520. In some examples, such a graphical element 516 may suggest an action associated with the particular user interface element 520. Or, in other examples, such a graphical element 516 may provide information about the particular user interface element 520. Like graphical element 514, graphical element 516 may be non-blocking and may remain fixed to the particular user interface element 520 until the graphical element 516 is dismissed and/or the particular user interface element 520 is no longer presented via GUI 500.

In at least one example, the graphical element 516 may provide a directive for training a user 108A how to interact with the particular user interface element 520. As described above, in some examples, a user 108A may interact with the graphical element 516 to trigger an action (e.g., via an interaction with the graphical element 516 or an action control) and/or launch a follow-up experience for completing the action. Graphical element 516, like graphical element 514, may be dismissed based on user interaction with the graphical element 516, user interaction with a different region of the GUI 500, or based on the presentation module 116 dismissing the graphical element 516, as described above. In some examples (e.g., when the graphical element 516 is associated with an action), graphical element 516 may not be dismissed until the user 108A completes the action or dismisses the graphical element 516.

FIG. 5E illustrates an example of a graphical element 524 that may be presented via the GUI 500. In at least one example, the presentation module 116 may present a graphical element 524 representing a directive via GUI 500. In this example, the graphical element 524 may be associated with one or more particular content items, one or more particular user interface elements (e.g., user interface element 506C), etc. In at least one example, the graphical element 524 may call attention to particular content item(s), particular user interface element(s) (e.g., user interface element 506C), etc. such to bring focus to particular content item(s), particular user interface element(s) (e.g., user interface element 506C), etc.

In at least one example, the graphical element 524 may be presented such that a user 108A may interact with content items (e.g., content items 504A-504D) and/or user interface elements (e.g., user interface elements 506A-506D) on the GUI 500. That is, the graphical element 524 may be non-blocking. Additionally, in at least one example, the graphical element 524 may be presented such that a user 108A may scroll through content items (e.g., content items 504A-504D). In such an example, the graphical element 524 may remain fixed to the particular content item, the particular user interface element (e.g., user interface element 506C), etc. until the graphical element 524, the particular user interface element (e.g., user interface element 506C), etc. is no longer presented via the GUI 500.

In at least one example, the graphical element 524 may be associated with a content item and/or user interface element (e.g., user interface element 506C) that is associated with an action (e.g., zoom-in, save, share, etc.). In at least one example, the graphical element 524, the content item, and/or the user interface element (e.g., user interface element 506C) may be associated with a control, the actuation of which may trigger the action. In at least one example, in response to the actuation, the presentation module 116 may effectuate the action and dismiss the graphical element 524. That is, the presentation module 116 may send an indication to the content service provider 104 to effectuate the action and may cause the graphical element 524 to be removed from the GUI 500.

In an additional and/or alternative example, the graphical element 524 may be associated with a content item and/or user interface element (e.g., user interface element 506C) and, based at least in part on a user 108A interacting with the content item and/or user interface element (e.g., user interface element 506C), the presentation module 116 may present an additional and/or alternative graphical element (e.g., graphical element 514).

Additionally and/or alternatively, a user 108A may perform a gesture (e.g., a swipe, tap, etc.) in association with the graphical element 524 such to dismiss the graphical element 524 without taking any action as suggested. In some examples, a graphical element 524 may be configured to be dismissed without any user interaction. That is, in at least one example, the presentation module 116 may dismiss the graphical element 524 after a lapse of a predetermined period of time, etc. Additionally and/or alternatively, the presentation module 116 may determine that a user 108A navigates away from the particular content item, particular user interface element (e.g., user interface element 506C), GUI 500, etc. and may not present the graphical element 524 if (or when) the user 108A navigates back to the particular content item, particular user interface element (e.g., user interface element 506C), GUI 500, etc. Or, if the particular content item (e.g., content item 504A) is no longer in view, the presentation module 116 may dismiss the graphical element 524.

FIG. 5F illustrates an example of a graphical element 526 that may be presented via the GUI 500. In at least one example, the presentation module 116 may present a graphical element 526 representing a directive via GUI 500. In at least one example, a graphical element may be associated with a directive having high importance (e.g., change to privacy policy, change to terms of service, etc.). In additional and/or alternative examples, a graphical element may be associated with a directive that otherwise warrants restricted access to features of the GUI 500. In at least one example, the presentation module 116 may present the overlay 528 until the presentation module 116 receives an indication that the user 108A accepts (or dismisses) the graphical element 526.

In at least one example, the derivative determination module 138 may determine a directive based at least in part on one or more previous actions of a user 108A. For instance, context data may indicate one or more content items recently saved by the user 108A, recently shared by the user 108A, etc. In at least one example, the one or more content items may be associated with a same topic. For instance, in FIG. 5F, the topic may be swim suits. In at least one example, the directive may depict, or otherwise present, content items with which the user 108A recently interacted, which may help the user 108A understand why the directive is being presented to the user 108A, for example.

In at least one example, graphical element 526 may include a first control 530 and/or a second control 532. In such an example, a user 108A may actuate the first control 530 to accept the directive associated with the graphical element 526 (i.e., start a collection). As described above, based at least in part on the user 108A accepting the directive, the presentation module 116 may send an indication that the user 108A accepts the directive and may dismiss the graphical element 526 (and the overlay 528). In some examples, the first control 530 may be associated with additional information and/or an additional experience. In such examples, the additional information and/or additional experience may be presented by the presentation module 116 prior to dismissing the graphical element 526 and/or the overlay 528.

In at least one example, a user 108A may actuate the second control 532 to dismiss the graphical element 526. In such an example, the presentation module 116 may send an indication that the user 108A dismissed the graphical element 526 (without accepting the directive). In some examples, the content service provider 104 may restrict access to certain features based on the user's (e.g., user 108A) failure to accept the directive.

In an alternative example, a graphical element that conveys same or similar information as graphical element 526 may be presented such that a user 108A may interact with content items (e.g., content items 504A-504D) and/or user interface elements (e.g., user interface elements 506A-506D) on the GUI 500. That is, such a graphical element may be non-blocking and/or non-restrictive. In such examples, the graphical element may be associated with one or more particular content items, one or more particular user interface elements, etc. In other examples, the graphical element may be generally presented via GUI 500. Additionally, in at least one example, such a graphical element may be presented such that a user 108A may scroll through content items (e.g., content items 504A-504D). In such an example, the graphical element may remain fixed to a particular content item, a particular user interface element, etc. until the graphical element, the particular content item, the particular user interface element, etc. is no longer presented via the GUI 500.

GUI 500 is but one example of a GUI that may be presented in association with a content service provider 104. Additional designs and/or configurations for presenting content items may be imagined. Furthermore, user interface elements (e.g., 506A-506D) are non-limiting examples of user interface elements. User interface elements may have various designs and/or configurations. As described above, user interface elements may represent actions that a user 108A may execute in associated with content item(s) and/or the GUI 500. Additionally and/or alternatively, user interface elements may represent features associated with the content service provider 104.

Furthermore, the graphical elements depicted and described in FIGS. 5A-5F are non-limiting examples of graphical elements. In additional and/or alternative examples, graphical elements may have different designs and/or configurations. For instance, as described above, in some examples, graphical elements may include illustrations, animations, etc. Additionally, in some examples, directives may be presented via a chat box, an avatar, a pop-up content item, etc.

FIGS. 6A-6D illustrate alternative examples of presenting directive(s) via GUI(s) 600, 602, and 604 on a display 606 of a device (e.g., device 102A). The presentation module 116 may present content item(s) (e.g., content item 608A, content item 608B, content item 608C, content item 608D, content item 608E, etc.) via GUIs 600, 602, and/or 604 pursuant to instructions received from the content service provider 104. As described above, a content item (e.g., content item 604A) may be an image, video, etc. In some examples, a content item (e.g., content item 604A) may represent a content item that is stored at a location remote from the content service provider 104. GUIs 600, 602, and/or 604 may include one or more user interface elements (not pictured in FIGS. 6A and 6B), which may be associated with individual content item(s) (e.g., content item 604A), the GUIs, etc.

In at least one example, the presentation module 116 may present a GUI without a graphical element, such as the graphical elements described above with reference to FIGS. 5A-5F. In such examples, the presentation module 116 may communicate a directive in some other manner.

Figure 6B:
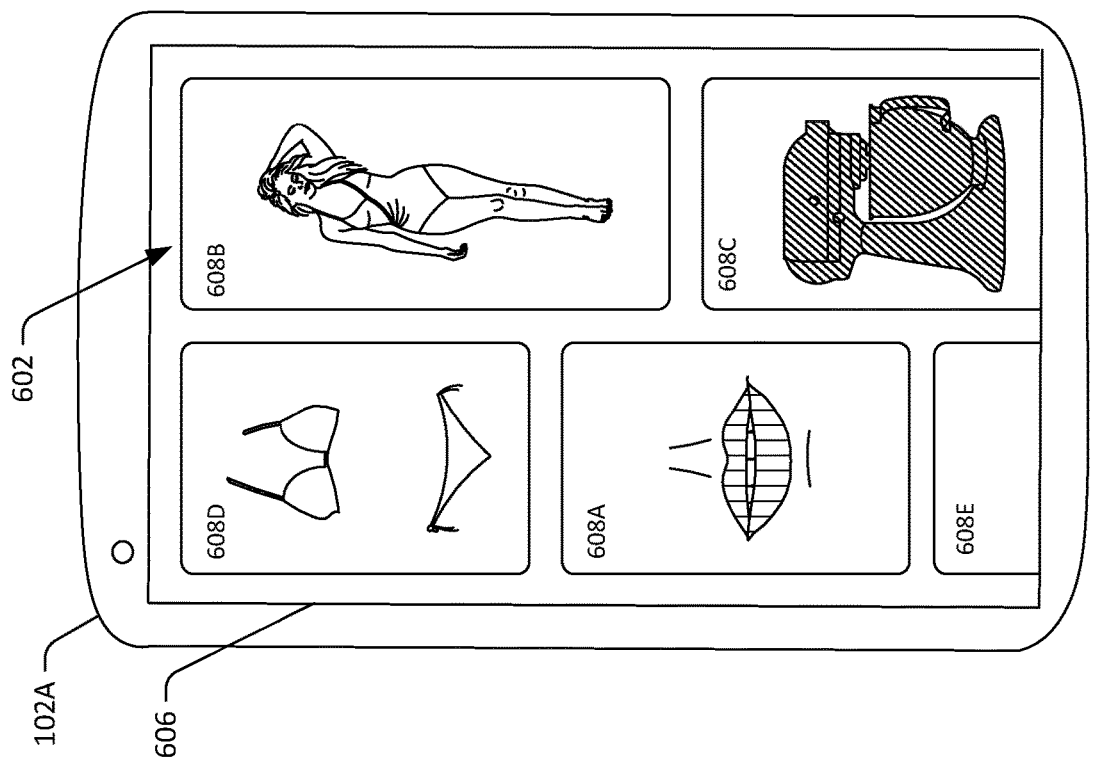
Figure 6A:
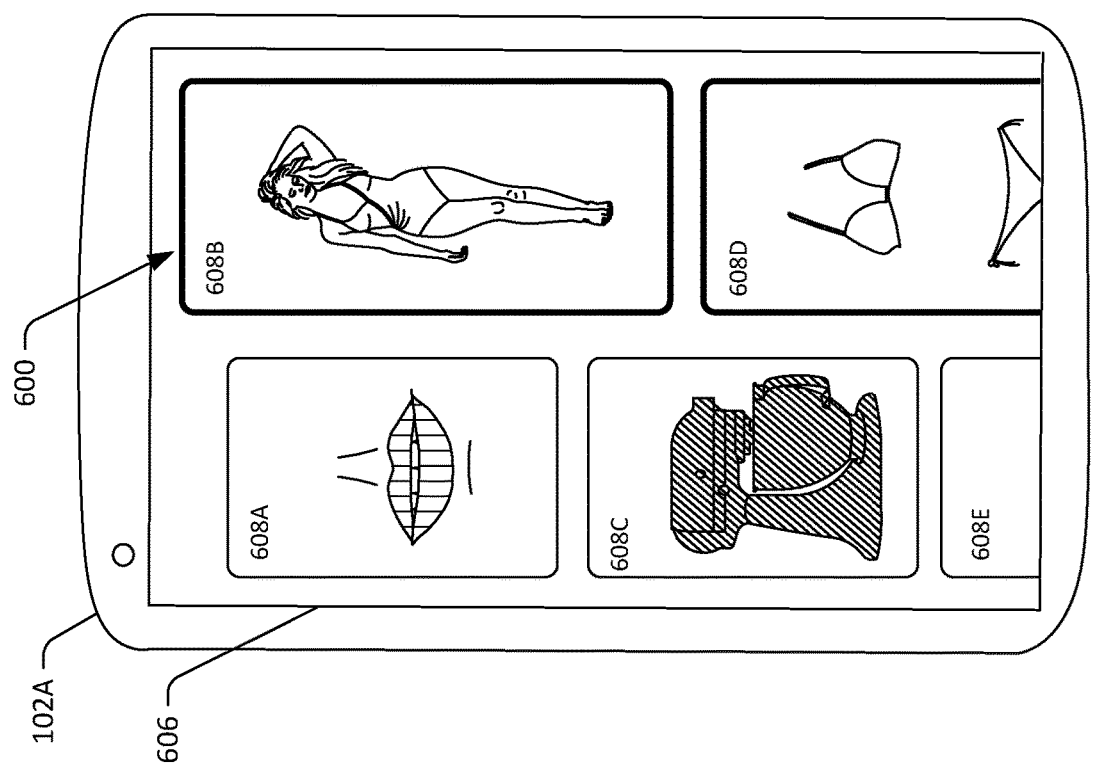

For instance, as illustrated in FIG. 6A, presentation module 116 may emphasize at least some content item(s), such as content item 608B and 608D, and may de-emphasize at least other content item(s), such as content item 608A, 608C, and 608E. In such an example, the presentation of the content items may encourage a user 108A to interact with the emphasized content items (e.g., content item 608B and content item 608D). In additional and/or alternative examples, the presentation module 116 may manipulate the presentation of one or more user interface elements and/or other aspects of the user interface to communicate a directive.

FIG. 6B illustrates a GUI 602 whereby the presentation module 116 rearranges the order of one or more content items. In such an example, the arrangement of the content items may encourage a user 108A to interact with particular content item(s) (e.g., content item(s) presented at the top of the GUI 602), etc.

FIGS. 6C and 6D illustrate a GUI 606 whereby the presentation module 116 removes user interface element(s) presented via the GUI 606 to simplify the GUI 606. FIG. 6C illustrates a GUI 606 as it would be presented to a casual user, for example. FIG. 6D illustrates the GUI 606 as it would be presented to a new user, for example. As illustrated, FIG. 6D depicts the GUI 606 with fewer user interface elements than FIG. 6C. For instance, FIG. 6C has a plurality of user interface elements 610 associated with various features of the content service provider 104 that are associated with each content item (e.g., content item 608A, content item 608B, content item 608C, content item 608D, content item 608E, etc.), whereas FIG. 6D includes a single user interface element 612 associated with each content item (e.g., content item 608A, content item 608B, content item 608C, content item 608D, content item 608E, etc.). GUIs 600, 602, and 604 are but three examples of GUIs that may be presented in association with a content service provider 104. Additional designs and/or configurations for presenting content items may be imagined.

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

What is claimed is:

1. A system for prompting interaction between a user and a graphical user interface (GUI) presented in association with a content service provider, the system comprising:
one or more processors; and
one or more computer-readable instructions executable by the one or more processors to:
determine, by a model and at a first time, an occurrence of a trigger event based at least in part on first context data, the trigger event causing a presentation of a directive to the user at a second time after the first time;
determine, in response to the trigger event, a state of the user, wherein the state of the user corresponds to a sophistication level of the user relative to services offered by the content service provider, the state being determined based at least in part on user data comprising at least one of one or more content collections associated with the user or indications of user interactions with at least one of individual content items or other users of the services offered by the content service provider;
receive, from a device operated by the user, second context data associated with the trigger event, the second context data identifying at least one of:
an action performed by the user in association with a particular content item presented by the content service provider via the GUI;
a type of the particular content item; or
an entry point indicating how the user accessed the particular content item;
determine an intent of the user based at least in part on the second context data;
determine the directive based at least in part on the state of the user and the intent of the user, wherein the directive is customized for the user and includes a prompt for the user to interact with a feature of the content service provider via the GUI and a time associated with the presentation of the prompt by the GUI;
access a set of policies associated with presenting directives;
send to the device operated by the user, based at least in part on accessing the set of policies, the directive to cause a graphical element to be presented via the GUI on a display of the device operated by the user;
determine feedback data based at least in part on data indicating whether the user interacted with the graphical element presented via the GUI; and
update, based at least in part on the feedback data, the model.

2. The system as recited in claim 1, the one or more computer-readable instructions executable by the one or more processors to:
compare the user data corresponding to the user with other user data associated with the one or more other users;
determine at least one other user of the one or more other users that shares at least one characteristic with the user; and
determine the directive further based at least in part on a portion of the other user data that is associated with the at least one other user.

3. The system as recited in claim 1, wherein:
the action performed by the user enables the user to at least one of:
magnify the particular content item; or
access additional information associated with the particular content item; and
the directive is associated with at least one of:
saving an indication of the particular content item to a profile associated with the user;
assigning an indication of the particular content item to a content collection; or
sharing an indication of the particular content item with the one or more other users.

4. The system as recited in claim 1, wherein:
the action performed by the user is associated with a plurality of actions;
each action in the plurality of actions is associated with individual content items that are associated with a topic; and the directive is directed to at least one of:
  generating a content collection associated with the topic; or
  accessing one or more additional content items associated with the topic.

5. The system as recited in claim 1, the one or more computer-readable instructions executable by the one or more processors further to at least one of:
  determine, based at least in part on the first context data, a position on the GUI for presenting the graphical element.

6. The system as recited in claim 1, wherein the user data further comprises one or more of:
  a length of time the user has been active with the content service provider;
  a number of content collections associated with the user;
  a number of interactions between the user and individual content items presented via the content service provider;
  a frequency with which the user interacts with the content service provider;
  types of interactions between the user and the individual content items presented via the content service provider; or
  interactions between the user and one or more other users of the content service provider.

7. The system as recited in claim 1, wherein the timing is associated with receiving an input indicating a dismissal of a graphical element from the GUI.

8. A computer-implemented method comprising:
  determining, by a model and at a first time, an occurrence of a trigger event based at least in part on first context data from a device, the trigger event causing a presentation of a directive to a user at a second time after the first time;
  determining, in response to the trigger event and based at least in part on user data associated with the user of a content service provider, a state associated with the user, wherein the state of the user corresponds to a sophistication level of the user relative to services offered by the content service provider, the state being determined based at least in part on user data comprising at least one of one or more content collections associated with the user or indications of user interactions with at least one of individual content items or other users of the services offered by the content service provider;
  receiving second context data from a device operated by the user, the second context data identifying at least one of:
    (i) an action performed by the user in association with one or more content items presented on a display of a user device via a graphical user interface (GUI) corresponding to the content service provider, or
    (ii) an entry point indicating how the user accessed the GUI;
  determining an intent of the user based at least in part on the second context data;
  determining based at least in part on the state associated with the user and the intent of the user, the directive that is customized for the user and prompts the user to interact with a feature of the content service provider via the GUI displayed on the display of the user device by at least one of accessing or using the feature and a time associated with the presentation of the prompt by the GUI;
  accessing a set of policies associated with presenting directives; and
  causing, at the second time and based at least in part on accessing the set of policies, a change to the GUI displayed on the user device to communicate the directive, the second time different than the first time, the second time associated with a dismissal of a graphical element of the GUI;
  determining feedback data based at least in part on data indicating whether the user interacted with the graphical element via the GUI; and
  updating, based at least in part on the feedback data, the model.

9. The computer-implemented method of claim 8, wherein the state is further determined based at least in part on a length of time the user has been active with the content service provider.

10. The computer-implemented method of claim 8, wherein the action performed by the user comprises:
  a scroll of the one or more content items presented via the GUI;
  a magnification of a particular content item of the one or more content items;
  a click-through associated with a particular content item of the one or more content items;
  a search associated with the content service provider;
  a share of a particular content item of the one or more content items;
  a pause associated with a particular content item of the one or more content items; or
  a screen capture of a particular content item of the one or more content items.

11. The computer-implemented method of claim 8, further comprising:
  determining that the entry point corresponds to a search result page;
  determining that the intent of the user is to access a content item associated with a search query; and
  determining the directive comprising instructions to prompt the user to access the one or more content items associated with the search query.

12. The computer-implemented method of claim 8, further comprising:
  determining that the entry point corresponds to a notification from the content service provider;
  determining that the intent of the user is to access a content item associated with the notification; and
  determining the directive comprising instructions to prompt the user to access the content item.

13. The computer-implemented method of claim 8, wherein causing the change to the GUI to communicate the directive comprises:
  causing at least a first aspect of the GUI to be deemphasized, the first aspect being unrelated to the directive; and
  causing at least a second aspect of the GUI to be emphasized, the second aspect being related to the directive.

14. The computer-implemented method of claim 8, wherein causing the change to the GUI to communicate the directive comprises causing a graphical element to be presented via the GUI, the graphical element presenting at least a portion of the directive.

15. The computer-implemented method of claim 8, wherein the user interactions comprise at least one of:
  a number of interactions between the user and individual content items presented by the content service provider via the GUI;

a frequency with which the user interacts with the content service provider;

types of interactions between the user and the individual content items presented by the content service provider via the GUI; or interactions between the user and one or more other users of the content service provider.

16. One or more non-transitory computer-readable media storing instructions that, when executed, cause one or more processors to perform operations comprising:

determining, by a model and at a first time, an occurrence of a trigger event based at least in part on first context data, the trigger event causing a presentation of a directive to a user at a second time after the first time;

determining, in response to the trigger event, a state of the user, wherein the state of the user corresponds to a sophistication level of the user relative to services offered by a content service provider, the state being determined based at least in part on user data comprising at least one of one or more content collections associated with the user or indications of user interactions with at least one of individual content items or other users of the services offered by the content service provider;

receiving, from a device operated by the user, second context data associated with the trigger event, the second context data identifying at least one of:

an action performed by the user in association with a particular content item presented by the content service provider via a graphical user interface (GUI);

a type of the particular content item; or an entry point indicating how the user accessed the particular content item;

determining an intent of the user based at least in part on the second context data;

determining the directive based at least in part on the state of the user and the intent of the user, wherein the directive is customized for the user and includes a prompt for the user to interact with a feature of the content service provider via the GUI and a time associated with the presentation of the prompt by the GUI;

accessing a set of policies associated with presenting directives;

sending to the device operated by the user, based at least in part on accessing the set of policies, the directive to cause a graphical element to be presented via the GUI on a display of the device operated by the user;

determining feedback data based at least in part on data indicating whether the user interacted with the graphical element presented via the GUI; and updating, based at least in part on the feedback data, the model.

17. The one or more non-transitory computer-readable media as recited in claim 16, wherein the operations further comprise:

comparing the user data corresponding to the user with other user data associated with the one or more other users;

determining at least one other user of the one or more other users that shares at least one characteristic with the user; and determining the directive further based at least in part on a portion of the other user data that is associated with the at least one other user.

18. The one or more non-transitory computer-readable media as recited in claim 16, wherein:

the action performed by the user enables the user to at least one of:

magnify the particular content item; or access additional information associated with the particular content item; and the directive is associated with at least one of:

saving an indication of the particular content item to a profile associated with the user;

assigning an indication of the particular content item to a content collection; or sharing an indication of the particular content item with the one or more other users.

19. The one or more non-transitory computer-readable media as recited in claim 16, wherein:

the action performed by the user is associated with a plurality of actions;

each action in the plurality of actions is associated with individual content items that are associated with a topic; and the directive is directed to at least one of:

generating a content collection associated with the topic; or accessing one or more additional content items associated with the topic.

20. The one or more non-transitory computer-readable media as recited in claim 16, wherein the operations further comprise determining, based at least in part on the first context data, a position on the GUI for presenting the graphical element.

\* \* \* \* \*